United States Patent
Sengupta et al.

(10) Patent No.: US 8,051,828 B2
(45) Date of Patent: Nov. 8, 2011

(54) MULTIPLE FUEL SYSTEM FOR INTERNAL COMBUSTION ENGINES

(75) Inventors: Bhaskar Sengupta, Princeton Junction, NJ (US); Krishnan Kumaran, Raritan, NJ (US); Walter Weissman, Basking Ridge, NJ (US); Randall D. Partridge, Califon, NJ (US); Kouseki Sugiyama, Numazu (JP); Keiji Yoeda, Numazu (JP); Tomihisa Oda, Numazu (JP); Yoshihiro Iwashita, Mishima (JP)

(73) Assignee: ExxonMobil Research and Engineering Company, Annandale, NJ (US)

( * ) Notice: Subject to any disclaimer, the term of this patent is extended or adjusted under 35 U.S.C. 154(b) by 338 days.

(21) Appl. No.: 12/316,030

(22) Filed: Dec. 9, 2008

(65) Prior Publication Data
US 2009/0242038 A1  Oct. 1, 2009

Related U.S. Application Data

(60) Provisional application No. 61/009,266, filed on Dec. 27, 2007.

(51) Int. Cl.
*F02M 43/04* (2006.01)
*F02M 43/00* (2006.01)

(52) U.S. Cl. ....................................................... 123/304
(58) Field of Classification Search .................. 123/304, 123/575, 576, 577, 578, 1 A; 701/103
See application file for complete search history.

(56) References Cited

U.S. PATENT DOCUMENTS

| | | | | |
|---|---|---|---|---|
| 6,119,637 | A * | 9/2000 | Matthews et al. | 123/3 |
| 6,332,448 | B1 * | 12/2001 | Ilyama et al. | 123/304 |
| 2005/0056264 | A1 * | 3/2005 | Weissman et al. | 123/577 |
| 2005/0109316 | A1 | 5/2005 | Oda | |
| 2007/0215069 | A1 | 9/2007 | Leone | |

FOREIGN PATENT DOCUMENTS

| | | |
|---|---|---|
| EP | 1 057 988 B1 | 1/2006 |
| WO | WO 02/077429 A1 | 10/2002 |

* cited by examiner

*Primary Examiner* — Mahmoud Gimie
(74) *Attorney, Agent, or Firm* — Paul E. Purwin

(57) ABSTRACT

A fuel management system mounted on a vehicle is operative to feed individually or a mixture of grades of relatively low, intermediate, and high autoignition temperature fuels to an associated internal combustion engine. The system includes an on board separation unit (OBS unit) for receiving and separating intermediate autoignition temperature (IAT) fuel into low and high autoignition temperature fuels, LAT and HAT, respectively. The production rate of the LAT and HAT fuels by the OBS unit is controlled to substantially match the consumption requirements of the engine at any given time for the LAT and HAT fuels.

79 Claims, 12 Drawing Sheets

MULTIPLE FUEL SYSTEM FOR INTERNAL COMBUSTION ENGINES

This application claims the benefit of U.S. Provisional Application No. 61/009,266 filed Dec. 27, 2007.

RELATED APPLICATIONS

The present invention is related to U.S. Provisional Application No. 61/009,336, entitled "Fuel Management For Vehicles Equipped With Multiple Tanks for Different Grades Of Fuel," filed on the same day herewith, having common inventorship herewith, and common ownership; to Ser. No. 11/187,672, filed on Jul. 22, 2005, for "Heat Pipe For Self Limiting Heating Of Gasoline For Onboard Octane Segregation"; and to Provisional Application No. 60/785,426, filed on Mar. 24, 2006, for "Heat Pipe With Controlled Fluid Charge." The teachings of the related Applications are incorporated by reference herein to the extent that they do not conflict herewith.

FIELD OF THE INVENTION

The present invention relates generally to systems for using multiple fuel of differing grades, such as different research octane numbers (RON) for spark ignition engines, and different cetane numbers for compression ignition engines, either individually or in a predetermined mixture for operating an internal combustion engine.

BACKGROUND OF THE INVENTION

Both petroleum refineries and engine manufacturers are constantly faced with the challenge of continually improving their products to meet increasingly severe governmental efficiency and emission requirements, and consumers' desires for enhanced performance. For example, in producing a fuel suitable for use in an internal combustion engine, petroleum producers blend a plurality of hydrocarbon containing streams to produce a product that will meet governmental combustion emission regulations and the engine manufacturers performance fuel criteria, such as research octane number (RON). Similarly, engine manufacturers conventionally design spark ignition type internal combustion engines around the properties of the fuel. For example, engine manufacturers endeavor to inhibit to the maximum extent possible the phenomenon of auto-ignition which typically results in knocking, and can cause engine damage, when a fuel with insufficient knock-resistance is combusted in the engine.

Under typical driving situations, engines operate under a wide range of conditions depending on many factors including ambient conditions (air temperature, humidity, etc.), vehicle load, speed, gear ratio, rate of acceleration, and the like. Engine manufacturers and fuel blenders have to design products which perform well under virtually all such diverse conditions. This requires compromise, as often times fuel properties or engine parameters that are desirable under certain speed/load conditions prove detrimental to overall performance at other speed/load conditions. Conventionally, vehicular fuels are supplied in two or three grades, typically distinguished by their Research Octane Number, or RON. Generally, the selection of fuel grade is based upon the engine specifications. However, once the fuel is "onboard," it becomes a "one fuel fits all" and must be designed to accommodate diverse speed, load and other driving conditions.

Attempts have been made to overcome the limitations of providing only a single grade of fuel for driving an internal combustion engine. In such attempts, systems have been developed for providing multiple fuels of different RON numbers "onboard" a vehicle, for driving the associated internal combustion engine with individual ones or mixtures of the fuels in a controlled manner for meeting the engine's drive cycle conditions over a broad range of operating conditions of the engine. Although these prior systems do offer an enhanced performance of an internal combustion engine, it is clear to those of skill in the art that such systems require further improvement.

SUMMARY OF THE INVENTION

An object of present invention is to provide for both production and consumption control of a plurality of fuels having differing RON numbers for optimizing the operation of an internal combustion engine.

Another object of the present invention is to provide an improved multiple RON fuel supply system that includes an onboard separation (OBS) apparatus for separating intermediate research octane (IRON) fuel from a main tank into at least two grades, one a high research octane (HRON), and the other low research octane (LRON), whereby the production of these fuels by the OBS and their consumption are controlled for delivery to an associated internal combustion engine in response to the engine's operating conditions.

Another object of the invention is to provide a multiple fuel delivery system for driving an internal combustion engine, wherein the consumption of these fuels either individually or in various mixtures is controlled through use of an optimal RON map, the latter providing mapping of engine operating parameters such as torque, speed, gear ratio, accelerator, and velocity, and so forth, to the RON fuel required by the internal combustion engine over a range of engine drive cycle conditions. Also, the control is programmed to vary the production of the LRON and HRON from the OBS as a function of the fuel consumption by the engine at any given time.

BRIEF DESCRIPTION OF THE DRAWINGS

Various embodiments of the present invention are described with reference to the drawings, in which like items are identified by the same reference designation, wherein.

DETAILED DESCRIPTION OF THE INVENTION

Figure 1:
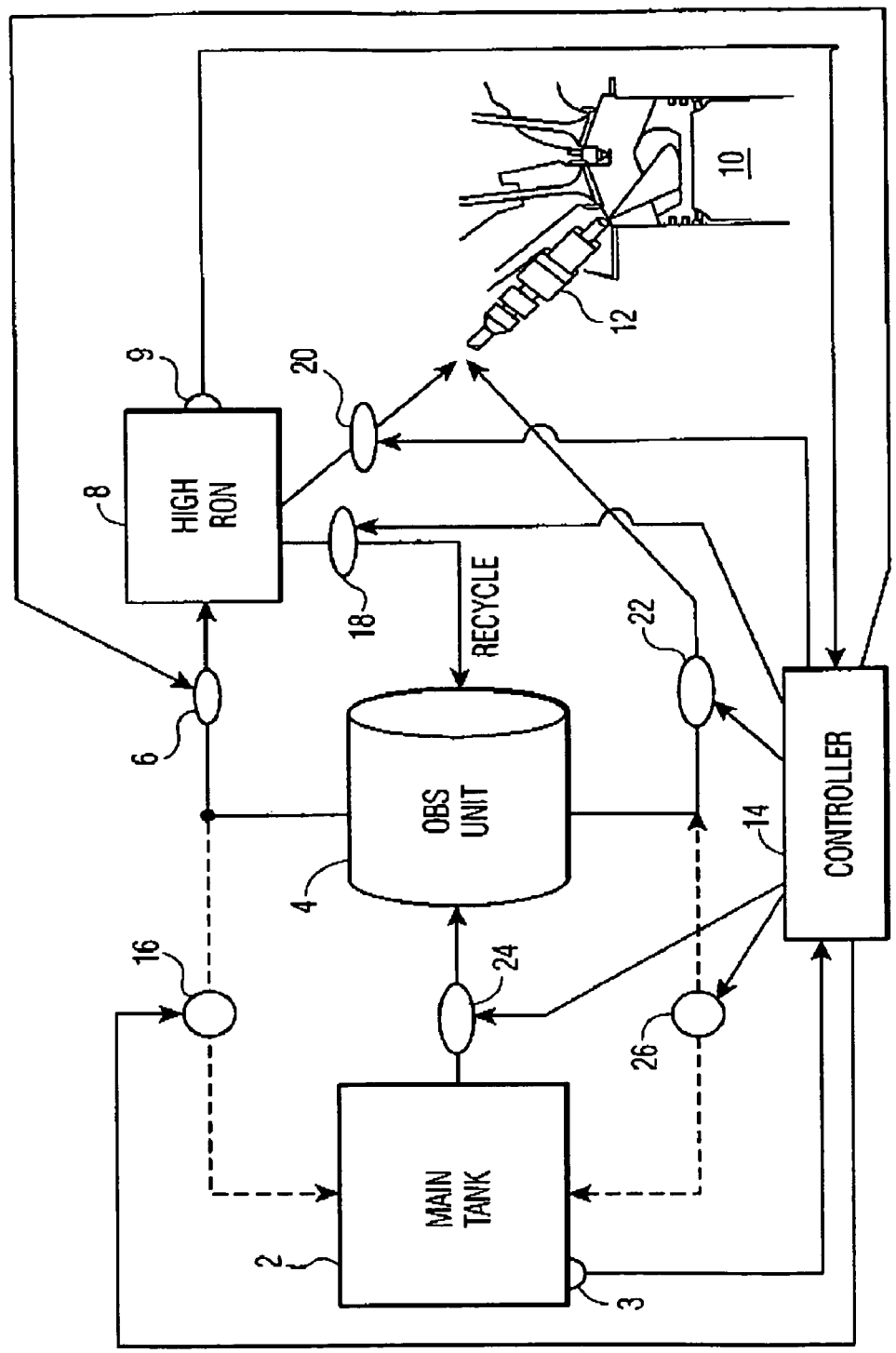
FIG. 1 is a simplified block schematic diagram of a fuel management system for one embodiment of the invention.

With reference to FIG. 1, a simplified block diagram of a fuel management system for one embodiment of the invention is shown. A main tank 2 for retaining an intermediate grade of Research Octane Number (RON) fuel is included in the associated vehicle. In this example, the intermediate RON fuel is also designated as IRON. A variable ratio pump 24 is operable for delivering the IRON fuel from the main tank 2 to an onboard separation (OBS) unit 4. The OBS unit 4 is operable for separating the IRON fuel into two grades, one being a high research octane (HRON) grade fuel, and the other being a low research octane (LRON) fuel. The HRON fuel is delivered from OBS unit 4 to an HRON fuel tank 8. The OBS unit 4 can be provided by separation devices using silica gel, distillation, membranes, and coated ceramic monoliths, for example. The preferred embodiments for an OBS unit 4 will be discussed in greater detail below. In the following discussion, for purposes of example, OBS unit 4 uses a membrane separator providing HRON as permeate, and LRON as retentate. Also, as will be described in further detail below, the present system provides for both control of the rate of production of the HRON and LRON fuel via the feed rate of IRON fuel to the OBS unit 4, in combination with consumption control based on availability of stored HRON fuel and mechanisms for minimizing contamination of main tank fuel with LRON fuel. Such control is provided continuously over the various cycles of operation of the engine 10.

A controller 14, such as a microprocessor, for example, is programmed to control operation of the present system. A liquid level sensor 3 is provided in the main tank 2, and monitored by the controller 14. Similarly, a liquid level sensor 9 is provided in the tank 8 storing HRON fuel, with the sensor 9 being monitored by controller 14. Also, in this example, the controller 14 is operable for controlling a pressure differential, such as an overflow valve or pump 16, for delivering HRON fuel from OBS unit 4 to the main tank 2 at times that the HRON tank 8 is completely filled with fuel; a pump 6 for delivering HRON fuel from OBS unit 4 to HRON tank 8; a pump 18 for delivering HRON fuel from tank 8 back to the OBS unit for recycling; a pump or valve 20 for delivering HRON fuel from tank 8 to a fuel injector system 12 of engine 10; a variable rate pump 22 for delivering LRON fuel from OBS unit 4 to the fuel injector system 12; a variable rate pump 24 for delivering IRON fuel to OBS unit 4; and a pump 26 for transferring excess LRON fuel from OBS unit 4 to the main tank 2. It should be noted that in certain applications, pumps such as 16, 6, 18, 22, and 26 can be replaced through use of gravity or pressure gradient feed transfer of the associated fuel.

During operation of the associated vehicle, depending upon the driver's requirements or engine load conditions at any time, fuel from HRON tank 8 and the LRON stream is delivered to the engine 10 by fuel injector system 12 in a given ratio. Note that the fuel injector system 12 may include a plurality of fuel injectors. Also, at certain times during operation of the engine 10 IRON fuel from the main tank 2 can be directly delivered to the fuel injector system 12 via pump 26 and variable rate pump 22. In this regard pump 26 can be a bidirectional pump or other suitable mechanism. Typically, the fuel mixture delivered to the fuel injector system 12 may include a given ratio of HRON and LRON fuels, or IRON and HRON fuels, or IRON and LRON fuels. Through use of the separation of the IRON fuel into HRON and LRON grades of fuels both more efficient fuel usage by engine 10 is attained, and short bursts of high engine power operation is provided through injection of a greater amount of HRON into the engine 10. More specifically, depending upon the load requirements of engine 10 at any given time, and also upon the availability of each of the three fuels in this example, maximizing efficient operation of engine 10 may at certain times require a greater amount LRON fuels, at other times a greater amount of HRON fuel, and if at any given time LRON fuel in the retentate stream is insufficient to meet the engine's demands, or HRON fuel from tank 8 is not available, the deficit is made up through use of IRON fuel from main tank 2. Also, if the OBS unit 4 over produces HRON or LRON fuels, the excess amounts thereof are returned to the main tank 2, as shown by the dashed or broken lines. Note that the pumps and/or valves mentioned above are provided for purposes of example only, and any other mechanisms that can provide the associated fuel delivery including gravity are meant to be included alternatively.

Figure 2:
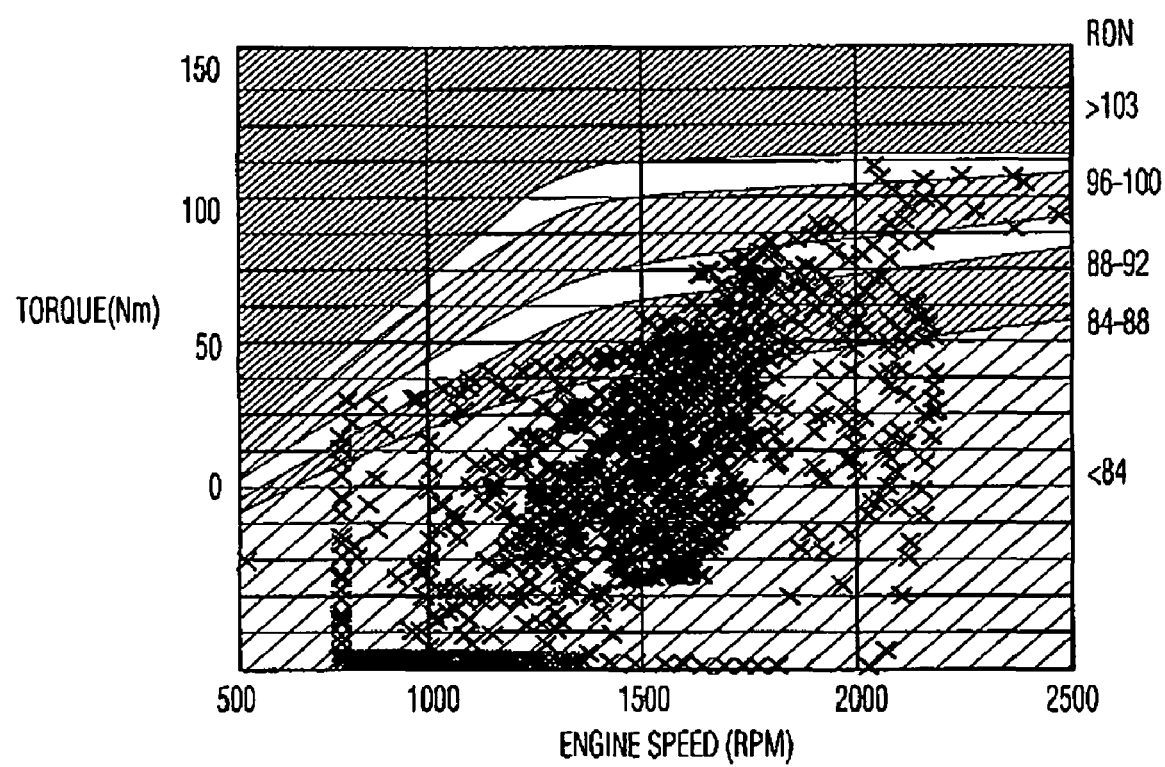
FIG. 2 shows an optimized research octane number (RON) map plotting torque versus engine speed for showing under ideal circumstances, the fuel RON for providing maximum engine performance for a particular combination of torque value and engine speed, for a preferred embodiment of the invention.

An Optimum RON Map is shown in FIG. 2 for mapping engine torque output against engine speed against the level of RON fuel required by the engine for optimal or most efficient operation. This mapping is represented by the following equation:

$$RON^{ideal} = f(\text{Torque, speed, gear ratio, accelerator, velocity}) \quad (1).$$

For ideal or optimal operation of engine 10, it should be provided with the proportion of fuel specified by the map of FIG. 2. However, when one of the normally available types of RON fuel is unavailable, controller 14 is programmed to deviate from the optimum RON map. Note that the optimal RON map of FIG. 2 was developed from a "Los Angeles 4" drive cycle, in this example. Also, in this example, the IRON fuel can be 91 RON, the HRON fuel 103 RON, and the LRON 88 RON. However, the invention is not meant to be limited to these RON fuel values.

In a preferred embodiment of the invention, the controller 14 is programmed to match the requirements of the driver of an associated vehicle to the production characteristics of the OBS unit 4. It is possible to control the present system in three different manners, as follows:

The feed rate of the OBS unit 4 can be varied through use of a variable pump 24 from 0.5 to 1.5 grams per second, for example. In this manner, the production rate of the OBS unit 4 is controlled. Note that the obtainment of such feed rate variation is not meant to be limited to use of a variable rate pump, whereas other mechanisms may also be utilized.

Through a recycle mechanism, the quantity of HRON fuel that is recycled to the OBS unit 4 can be varied within certain limits. For example, a variable rate pump 18 can be controlled for varying the HRON recycle rate from 0 to 0.4 grams per second (g/s) for the present system, but this rate is not meant to be limiting.

The engine 10 can at any instant in time draw HRON fuel from the HRON tank 8, and/or stream for LRON fuel, and/or IRON fuel from the main tank 2, in any proportion. In this example, the proportion is under the control of the controller 14 operating pump/valve 20, pump 22, and bidirectional pump 26.

In the preferred embodiment of the invention, the controller 14 is programmed to jointly control the instantaneous behavior of the OBS unit 4 via control of the feed rate thereto of IRON fuel, as previously mentioned, and the instantaneous demands of the engine 10 relative to which fuels to mix and in what proportion. Further note that in the system of FIG. 1, the pumps 16 and 26 can be considered optional, if as previously mentioned, gravity feed or pressure differential is utilized for returning HRON and/or LRON fuel to the main tank 2.

The control algorithms illustrated herein are independent of the method of separation employed, that is independent of the type of OBS unit 4 utilized. As previously mentioned, the OBS unit 4 can be provided by both a distillation method or by a membrane method for obtaining the desired fuel separation. The present method is also applicable with modification for utilizing an OBS unit 4 that separates the IRON fuel into more than two grades of RON fuel.

The present inventors recognize that the control algorithm or algorithms utilized must be capable of controlling the production rate of the OBS unit 4 to match the driver's requirements, that is the loading on the engine 10 at any given time. In other words, controller 14 must have the ability to change the feed rate of IRON fuel to the OBS unit 4 in a manner increasing the feed rate should the engine 10 demand more fuel of a particular type due to a driver's operating requirements. For the same reason, the controller 14 must have the ability to decrease the feed rate should that be necessary. Also, the controller 14 must be programmed to provide a fuel mixture that is matched to the present production of the OBS unit 4. For example, if a driver requires a relatively large amount of HRON fuel, and the HRON tank 8 is empty, it is then necessary for the controller 14 to operate to feed LRON fuel, and/or IRON fuel from the main tank 2 to make up for the deficit of HRON fuel.

In the preferred embodiment, the controller 14 is programmed to the greatest extent possible to match the LRON consumption rate by engine 10 as closely as possible to the LRON production rate by OBS unit 4. Such control is necessary to minimize the return of LRON fuel to the main tank 2, in that such action tends to degrade the quality of the fuel in the main tank. Such matching is also desirable to minimize any increase in the ratio, for example, membrane permeate flux to feed rate to the point that it degrades HRON fuel quality produced.

The development of the control algorithm for the preferred embodiment of the invention will now be described. The algorithm is based upon establishing one or more thresholds for the fuel level of HRON fuel in HRON tank 8. It was determined that the HRON tank 8 should have at least one threshold fuel level designated as HL for designating HRON lower. Optionally, another threshold level HLL, which is a lower fuel level than HL, stands for HRON lower lower. It is assumed that the controller 14 is operable for increasing or decreasing the OBS unit 4 IRON feed rate at any given time, and that the flows produced by the OBS unit 4 can be fed to the engine individually, or in any necessary mixture depending upon the engine 10 operating demands. It is further assumed that controller 14 has fast enough operation for modifying the fuel mixture or fuel delivered to the engine 10 in a seamless manner undetectable by a driver of the vehicle.

The present system is operable for balancing the production and consumption of LRON fuel over a successively short measuring time period to substantially minimize, and preferably avoid, overflow of LRON fuel back to the main tank 2. This is accomplished by controlling the feed rate of IRON fuel to the OBS unit 4 to substantially insure at all times that the LRON production closely tracks the short term LRON consumption through use of the formula:

$$F = L + h \quad (2),$$

wherein F is the gross feed rate (fresh feed of IRON from tank 2 plus HRON recycle from tank 8), L is the estimated average LRON consumption rate, and h is the HRON total production rate, the latter being the permeate flux when a membrane type OBS unit 4 is used. L can be directly measured at the engine 10 fuel injector system 12. However, with the present state of the art, it has been observed that this formula or equation cannot be satisfied instantaneously. The reason is that the OBS unit 4 presently available for use in an engineering prototype has a slow response time, in the order of minutes, compared to engine demands that typically are in the order of seconds or factions of a second. To overcome this present problem, time averaging must be applied to the OBS unit 4 feed rate setting, through use of either exponential smoothing or a windowing mechanism, for example. For a membrane based separation unit, the membrane can be designed so that the permeate flux h changes very slowly over a time frame of months or even years. The flux variation can be "hard-coded" into the controller 14 as an approximation, thereby permitting the feed rate F to be controlled purely as a function of a single variable, mainly the LRON consumption. Alternatively, the flux can be estimated through use of changes in the level of HRON fuel in tank 8 in conjunction with the HRON consumption rate. In a preferred embodiment, the controlled mechanism is further programmed to monitor when the level of IRON fuel in the main tank 2 drops to a predetermined low level, such as 10% to 20% of capacity, to reduce the feed rate of IRON fuel from main tank 2 to the OBS unit 4 to a minimum value, while at the same time meeting the HRON requirements of the engine 10 by feeding IRON fuel from the main tank 2 to the engine 10, to make up for any insufficiency of HRON fuel engine requirement at a given time. Through use of this extended control programming or mechanism, the degradation of the IRON fuel in the main tank 2 is minimized at times when the IRON fuel is most susceptible to degradation by return of LRON fuel to the main tank 2, due to the low level of IRON fuel thereof.

Programming of the controller 14 in order to provide consumption control will now be described. When the level of HRON fuel in tank 8 is higher than a predetermined threshold level designated HL, the actual RON value of the fuel used (as set by the proportion of LRON and HRON fuels used) is the same as that specified by the optimum RON map of FIG. 2, as represented by the following equation:

$$RON^{actual} = RON^{ideal} \quad (3).$$

Consumption control is necessitated when the level of HRON fuel in tank 8 decreases to a level where the preferred control strategy is to use LRON or IRON fuel at times that engine 10 actually requires HRON fuel, in order to minimize the possibility of the HRON fuel in tank 8 being totally depleted. In order to obtain this control, a suitably modified RON map combined with control of the retardation of the engine spark when fueling a spark ignition internal combustion engine, in a manner that is inconsequential to a driver. The basis for the control can also be provided for a compression combustion ignition engine (diesel or HCCI, for example) by the additional parameter of cetane number and an ideal cetane number map. The actual control, in addition to use of the ideal cetane number map, can be provided by appropriate parameters such as valve timing, injection timing, intake air temperature or combinations of these, to control knock. In either case, this can be accomplished by employing a correction factor to the optimum RON map of FIG. 2 at times when the level of HRON fuel in tank 8 drops below level HL but is above threshold level HLL, the correction factor being applied as shown in the following equation:

$$RON^{actual} = \alpha RON^{ideal} \quad (4),$$

$$\alpha = g(\text{torque, speed, gear ratio, accelerator velocity}) \quad (5).$$

Figure 3:
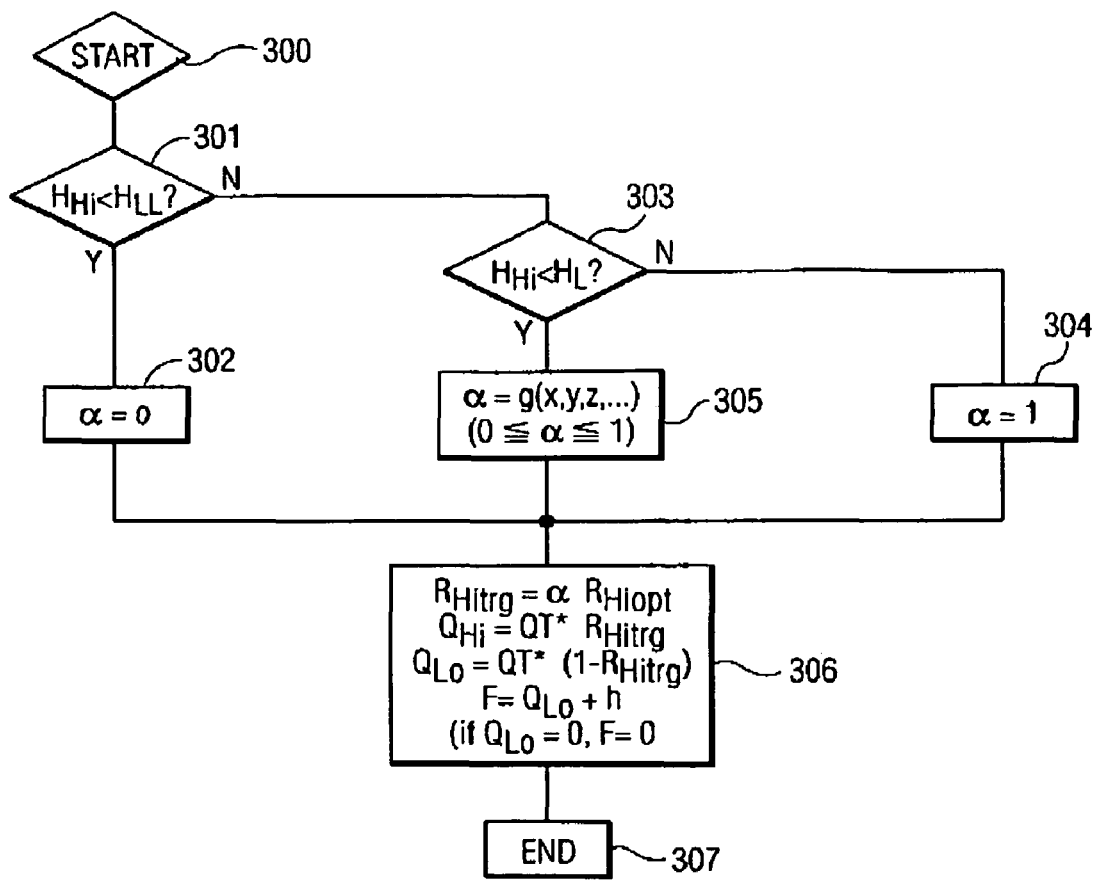
FIG. 3 shows a flowchart for a control algorithm for an embodiment of the invention.

Note that in this control example, the correction factor $\alpha$ can be made to depend on a numbers of engine parameters, including gear ratio and the accelerator velocity, as shown above in order to rapidly accommodate the RON requirements of engine 10. For example, if at a given time engine 10 is in a high acceleration mode, when use of HRON fuel is preferred, $\alpha$ can be set close to 1. Under other engine operating conditions, LRON or IRON fuel can be substituted in larger quantities with the necessary level of spark retardation or advance such as with high speed/high fuel consumption. In this latter case, $\alpha$ is less than 1, which may result in a temporary reduction in fuel efficiency. Similarly, in a high acceleration mode for a compression combustion ignition engine (diesel or HCCI, for example), the control is effected through an examination of the cetane number required by the engine. If the optimum cetane number is not available, this can be inferred by sensing the noise due to knocking, whereby if the noise is excessive, it can be reduced by changing the valve timing, etc. When the level of HRON fuel in tank 8 is less than the level HLL, it is preferred to avoid any further use of HRON fuel, in order to prevent damage to various engine components, such as pump wear, and so forth. At such times, the controller 14 is programmed to operate the fueling system to provide either LRON fuel from the retentate stream, and/or IRON fuel from the main tank 2. It should be noted that the control algorithm described above in equations (4) and (5) can be modified to be operable for more than two predetermined levels of HRON fuel in tank 8. For conventional diesel engines, the following equation "(6)" can be used to balance cetane number along with operating conditions to reduce diesel particulate matter:

$$\delta PM = C_1 \Delta CN + C_2 \Delta A\text{-Ring} + C_3 \Delta N\text{-Ring} \quad (6)$$

where, $\delta PM$: PM (particulate matter) fraction reduction relative to TF-ao
$\Delta$: difference with respect to TF-ao CN: cetane number
A-Ring: aromatic rings (wt %)
N-Ring: naphthene rings (wt %)
Ci: regression coefficient (i=1, 2, 3)
$C_1 = 0.0055$
$C_2 = 0.017$
$C_3 = 0.0065$
TF: TF-series fuels The algorithm of equations (4) and (5) as described above, is depicted in a flowchart in FIG. 3. With reference to FIG. 3, controller 14 is programmed to enter step 300 for initiating the subroutine shown. In step 301, the output of the level sensor 9 is monitored by controller 14 to determine whether the level of HRON fuel designated as $H_{Hi}$ (HRON fuel content or level in tank 8) is less than $H_{LL}$ (HRON fuel lower level limit). If the answer is yes, then step 302 is entered for setting $\alpha$ to zero. Alternatively, if in decision step 301 the answer is no, then step 303 is entered, which is a decision step for determining whether $H_{Hi}$ is less than $H_L$ (where $H_L$ is a low level of HRON fuel in tank 8 that is higher than $H_{LL}$). If in step 303 the answer is no, then step 304 is entered for setting $\alpha = 1$. Alternatively, if in decision step 303, the answer is yes, step 305 is entered for setting $\alpha$ equal to a value determined by the function of torque, speed, gear ratio, and so forth, where $\alpha$ will be greater than or equal to zero and less than or equal to 1. Step 306 is entered into after either one of the steps 302, or 305, or 304 are carried out, and the equations shown are calculated. In the equations shown, $\alpha$ is the correction factor as previously mentioned, $R_{Hitrg}$ is the HRON injection ratio, $R_{Hiopt}$ is the optimal HRON injection ratio as obtained from the optimum RON map of FIG. 2, $Q_{Hi}$ is the HRON fuel consumption rate, $Q_T$ is the total fuel being consumed, $R_{Hitrg}$ is the actual HRON fuel injection ratio, $Q_{Lo}$ is the LRON fuel consumption, $Q_T$ is the total fuel consumption, F is the feed rate which represents the sum of the IRON being fed to OBS unit 4 and the HRON being recycled, $Q_{Lo}$ is the LRON fuel consumption, and h is the membrane flux.

Figure 4A:
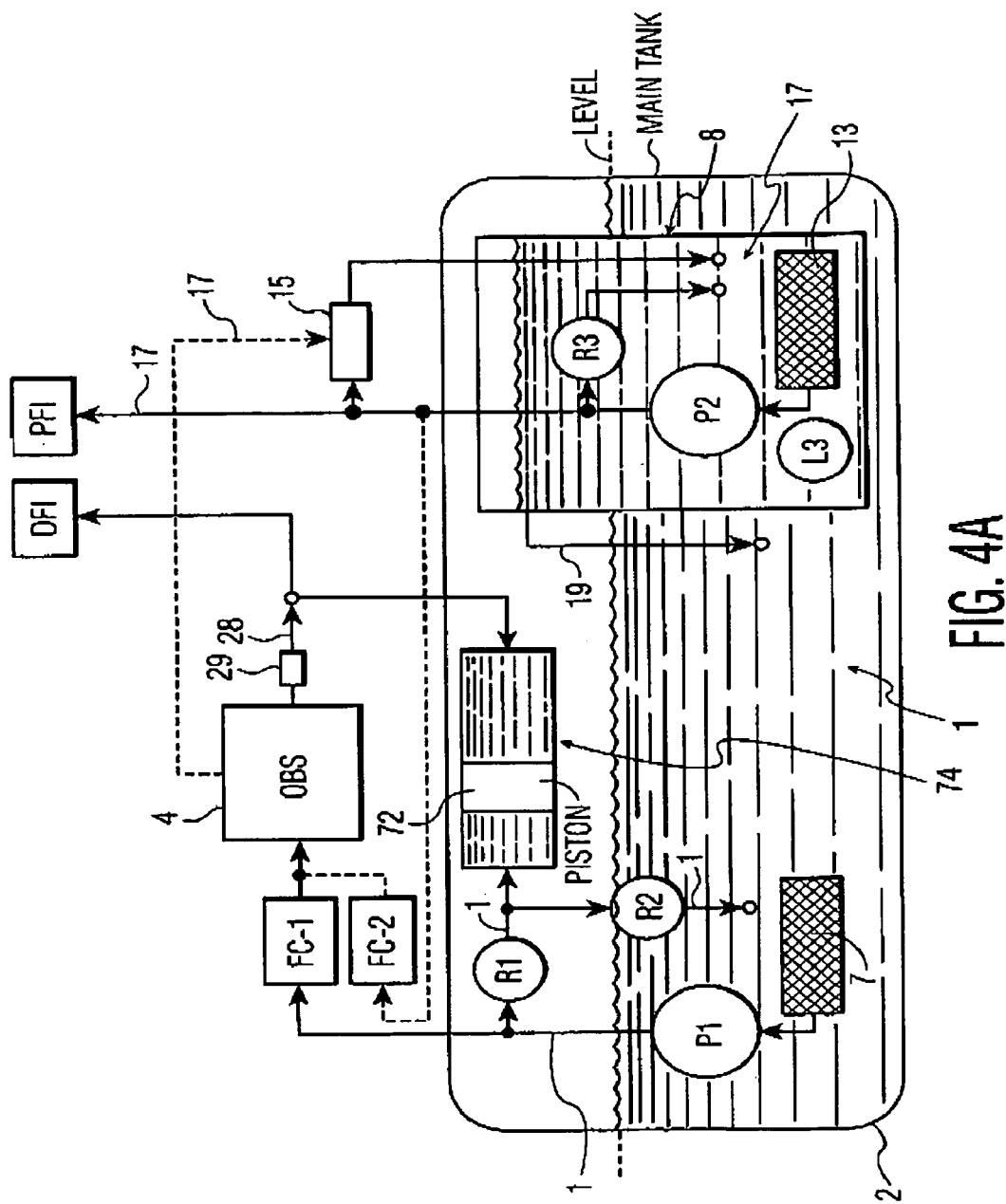
FIG. 4A shows a block schematic diagram of a fuel management system for one embodiment of the invention.

In FIG. 4A, a preferred embodiment of the invention is shown for a fuel management system, the operation of which will now be described. IRON fuel 1 contained in the main tank 2 is drawn through a filter 7 and pressurized by means of pump P1 against pressure regulators R1 and R2. In this example pressure regulator R1 was set to maintain a 100 kpa pressure differential above R2. Pressure regulator R2 was set to maintain a pressure of 200 kpag. Therefore, the pressure provided by pump P1 was ~300 kpag. The pressurized IRON fuel 1 flow rate is set by flow controller FC-1 to the OBS separation unit 4. Excess pressurized IRON fuel 1 is returned to the main tank 2 through pressure regulator R2.

Separated HRON fuel 17, and LRON fuel 28, from the OBS unit 4 are directed to the engine fuel injectors DFI (direct fuel injection system), and PFI (port fuel injection system), or to the storage volumes shown as accumulator 74 and HRON tank 8. LRON fuel 28 is provided to the DFI injection system on demand. Excess LRON fuel 28 is directed to the accumulator 74. IRON fuel 1 displaced from the accumulator 74 is returned to the main tank 2 through the secondary pressure regulator R2. At the limit of the accumulator 74 volume, excess LRON fuel 28 flows into the main tank 2 along with excess IRON fuel 1 through pressure regulator R2. If demand for LRON fuel 28 exceeds the OBS unit 4 production rate, additional LRON fuel 28 and/or IRON fuel 1 is provided by means of the accumulator 74. A check valve 29 prevents backflow to the OBS unit 4.

HRON fuel 17 produced by the OBS unit 4 is delivered to the HRON tank 8 by means of an eductor pump 15, or other suitable means. The HRON fuel 17 in the HRON tank 8 is pressurized by means of pump P2 after passing through a filter 13 with the pressure controlled by pressure regulator R3. Excess pressurized HRON fuel 17 returns to the HRON tank 8 through R3. The pressurized HRON fuel 17 is provided to the port fuel injector (PFI) and to the eductor pump 15, with excess fuel returning to the HRON tank 8. An overflow tube 19 is provided to allow excess HRON fuel 17 accumulated in the HRON tank 8 to overflow into the main tank 2. A float type level sensor L3 provides a continuous measure of the level of HRON fuel 17 in the HRON tank 8.

Figure 4B:
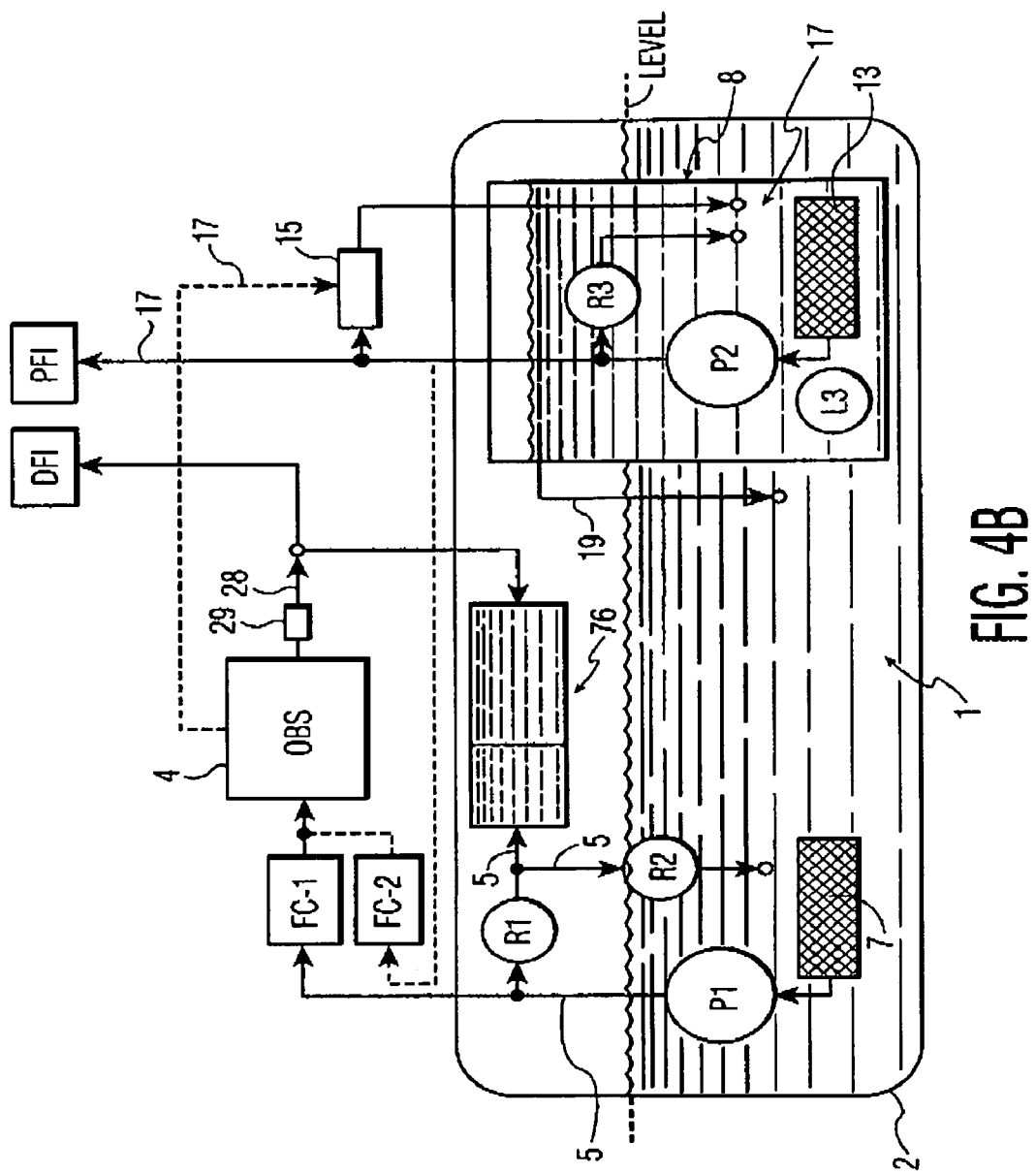
FIG. 4B shows a block schematic diagram of a fuel management system for another embodiment of the invention.

In the fuel management system of FIG. 4A, the accumulator 74 is a piston type including a moveable piston 72. The fuel management system of FIG. 4B is substantially identical to that of FIG. 4A. However, in the system of FIG. 4B, rather than a piston accumulator 74 being used, an accumulator volume 76 is utilized, and can be provided by a tubular cavity, for example. As previously mentioned, in the preferred embodiment, the piston accumulator 74 is utilized. When cost is a factor, a tubular design is most preferred.

Figure 4C:
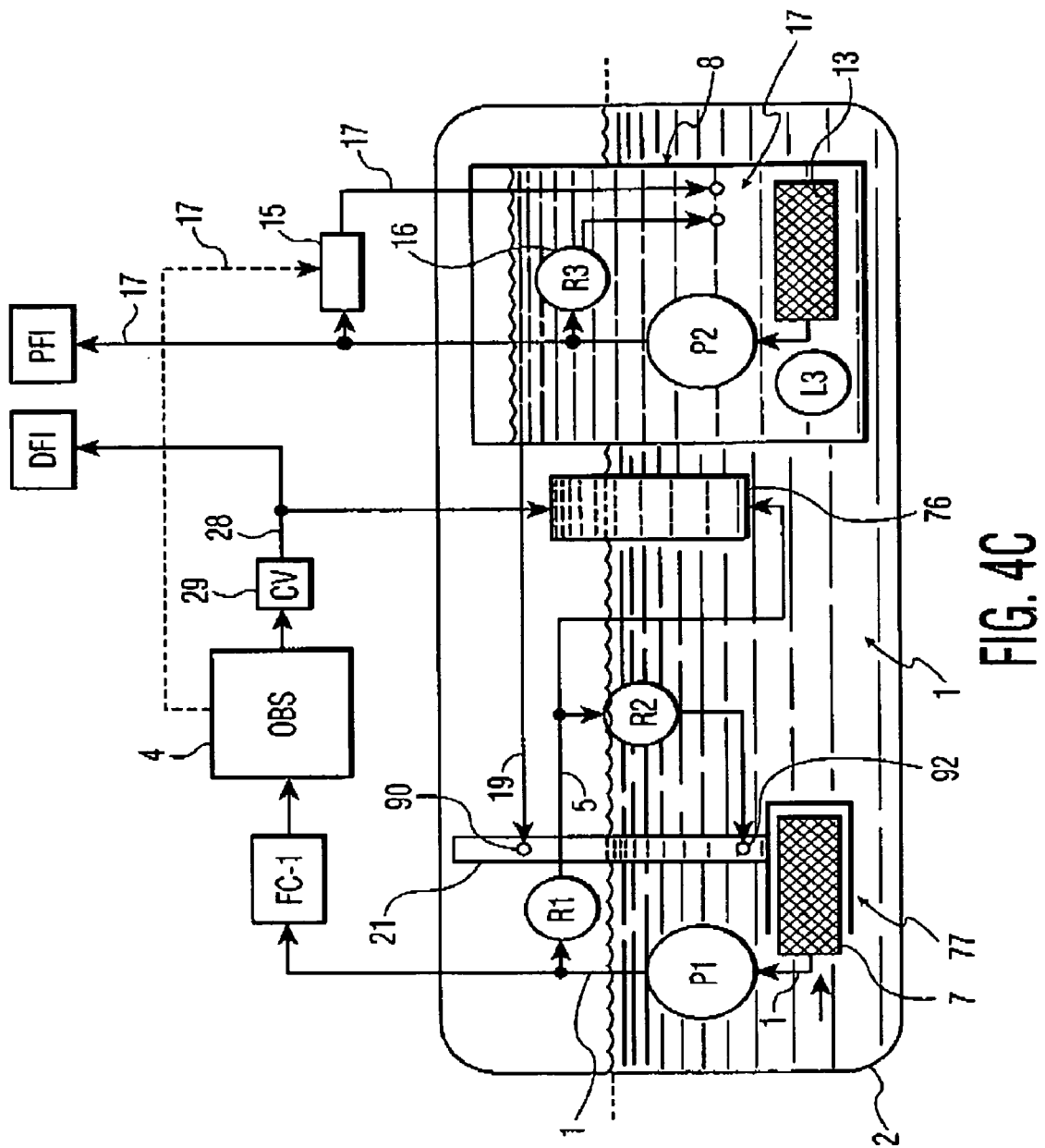
FIG. 4C shows a block schematic diagram of a fuel management system for another embodiment of the invention.

With reference to FIG. 4C, a simplified fuel management system with passive recycle will now be described for another embodiment of the invention. This embodiment provides for managing fuel flow from the OBS unit 4 with essentially no dilution of the main tank IRON fuel 1 by excess LRON fuel 28 or HRON 17. IRON fuel 1 contained in the main tank 2 is drawn through filter 7 and pressurized by means of pump P1 against pressure regulators R1 and R2. Pressure regulator R1 is set to typically maintain a 25 to 100 kpa pressure differential above R2. Pressure regulator R2 is typically set to maintain a pressure of 200-600 kPag. The pressure provided by pump P1 is typically 400 kPag. Pressurized IRON fuel 1 flow rate is set by flow controller FC-1 to the OBS separation unit 4. Excess pressurized IRON fuel 1 is returned to the inlet of the pump P1 through pressure regulator R2 by directing the flow to a standpipe 21, and therefrom into a filter shroud 77.

Alternatively, the excess HRON fuel 17 return can be connected directly to a first inlet port 90 of the fuel suction pipe or standpipe 21, and directly therefrom to an inlet or fuel feed port (not shown) of pump P1. Also, alternatively, excess LRON fuel 28 return can be connected via pressure regulator R2 to a second port 92 of the fuel suction pipe or standpipe 21, and directly therefrom to an inlet or fuel feed port (not shown) of pump P1. Note that port 92 can also receive excess IRON fuel 1 via pressure regulator R2.

Separated HRON fuel 17 and LRON fuel 28 from the OBS unit 4 are directed to the engine fuel injectors PFI, DFI, respectively, or to the storage volumes provided by accumulator volume 76, appropriately sized to minimize mixing of the two fuels, and HRON tank 8, as shown. LRON fuel 28 is provided to the direct fuel injection system DFI on demand. Excess LRON fuel 28 is directed into the storage volume provided by accumulator 76. IRON fuel 1 displaced from the accumulator 76 is returned to the inlet of the pump P1 through pressure regulator R2 by directing the flow to the standpipe 21 and filter shroud 36.

At the limit of the accumulator 76 volume, excess LRON fuel 28 flows into standpipe 21 along with excess IRON fuel 1 through pressure regulator R2. If demand for LRON fuel 28 exceeds the OBS unit 4 production rate, additional LRON fuel 28 and/or IRON fuel 1 is provided by means of the volume of the accumulator 76. A check valve 29 prevents backflow to the OBS unit 4.

HRON fuel 17 produced by the OBS unit 4 is delivered to the HRON tank 8 by means of an eductor pump 15, or other suitable means. The HRON fuel 17 in the HRON tank 8 is pressurized by means of pump P2 after passing through filter 13 with the pressure being controlled by pressure regulator R3. Excess pressurized HRON fuel 17 returns to the HRON tank 8 through regulator R3. The pressurized HRON fuel 17 is provided to the PFI port fuel injector and to the eductor pump 15, with excess fuel returning to the HRON tank 8. An overflow tube 19 is provided to allow excess HRON fuel 17 accumulated in the HRON tank 8 to overflow into standpipe 21. Excess HRON fuel 17 is recycled to the OBS unit 4 by being drawn from the standpipe 21 though filter shroud 36 and filter 7 by means of pump P1 and flow control FC-1. A float type or other suitable level sensor L3 provides a measure of the level of HRON fuel 17 in the HRON tank 8.

Figure 8:
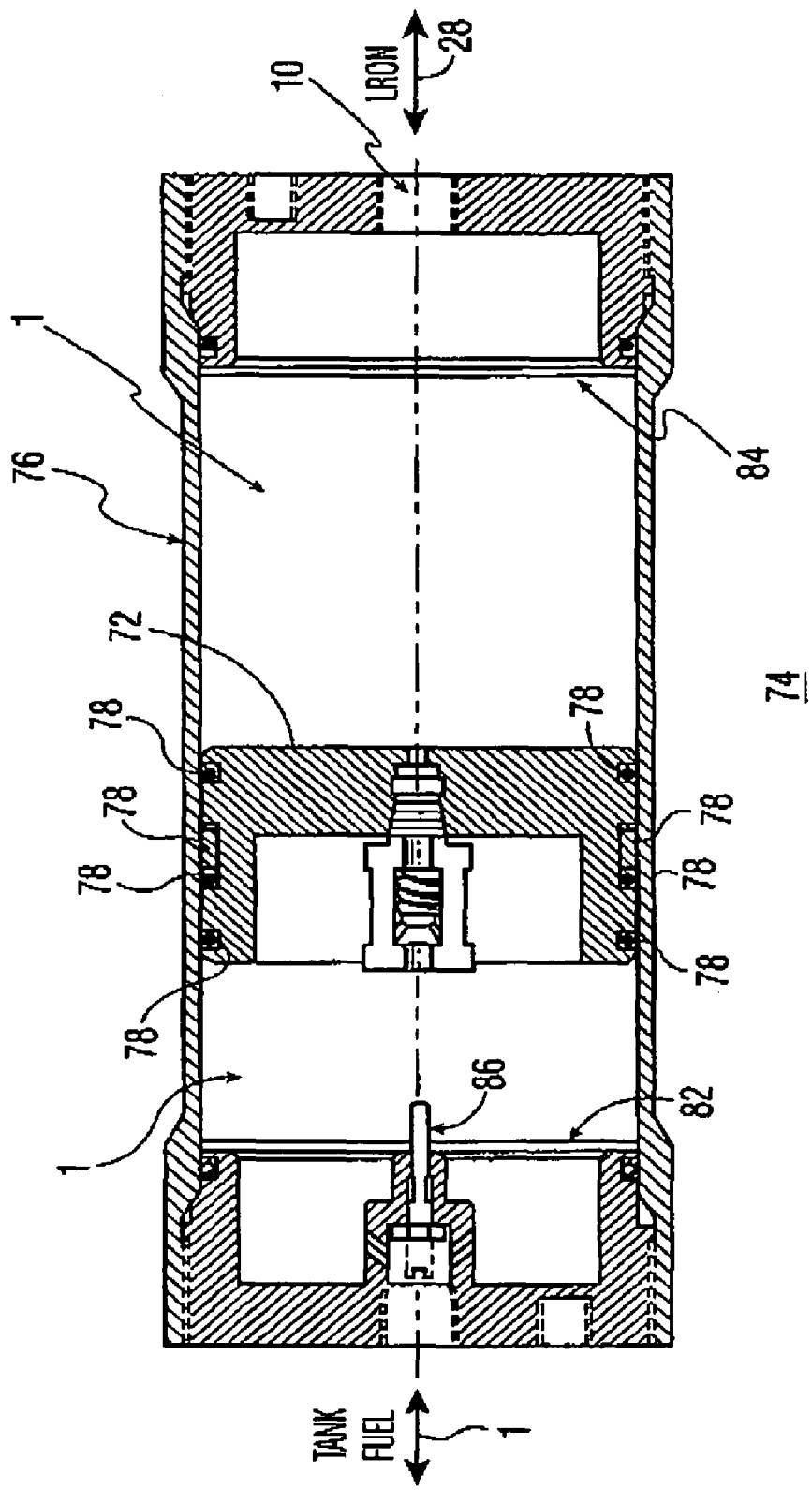
FIG. 8 shows a longitudinal cross sectional view detailing various aspects of the design for a two-way piston accumulator for an embodiment of the invention.

In FIG. 8, an example of the design details for accumulator 74 for the embodiment of the invention of FIG. 4A is shown, but is not meant to be limiting in that other accumulator designs can be used. The accumulator 74 consists of a piston 72 and cylindrical housing 77 having a nominal displacement volume of 750 cm$^3$ as used in experimental vehicle tests. The piston 72 uses Teflon® sealing rings 78 providing low resistance to movement such that the piston travels freely with minimal, i.e. <10 kPa, of differential pressure. The piston 72 incorporates a modified check valve 80, Swagelok SS-2-C2-1 or equivalent, which provides sealing of the piston 72 during travel, but opens to allow flow of IRON fuel 1 and LRON fuel 28 at the opposing ends of travel limited by the cylinder faces 82 and 84, respectively. With flow in the direction associated with the normal opening function of the check valve 80, it opens to allow flow through the piston 72 when the piston 72 travel is stopped by the cylinder face 84, providing IRON fuel 1 to the DFI fuel injector from the main tank 2 as required. When excess LRON fuel 28 is produced, the piston 72 travels in the opposite direction with the piston sealed by the check valve 80 until reaching the opposite cylinder face 82. As the piston 72 approaches the cylinder face 82, a pin 86 adjusted to push open the check valve 80 as the piston approaches the cylinder face 82 is engaged to allow flow of LRON fuel 28 to the main tank against the back pressure of regulator R2 (not shown, see FIG. 4A).

Figure 5:
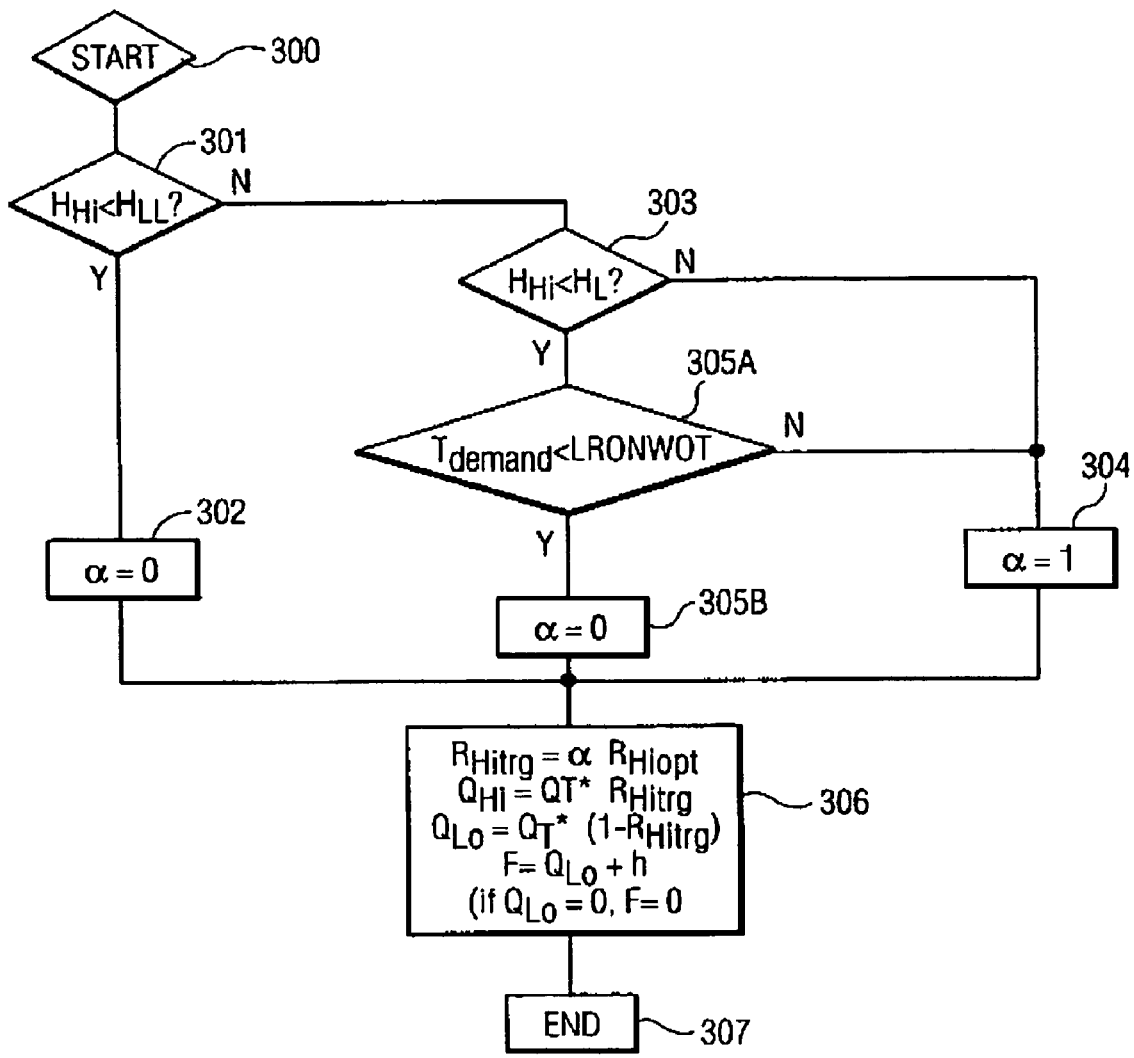
FIG. 5 shows a flowchart for an algorithm for another embodiment of the invention in which torque and speed requirements of an engine can be met through use of low research octane number (LRON) fuel alone.

With further reference to the flowchart of FIG. 3 showing operation of a control algorithm for controller 14, note that during times that the torque and speed requirements of the engine 10 can be met by use of LRON fuel alone, then α can be set to zero as shown in step 305(B) of the modified flowchart of FIG. 5. More specifically, as shown in the flowchart of FIG. 5, compared to that of FIG. 3, step 305 of FIG. 3 has been replaced by Steps 305(A) and 305(B) in FIG. 5. In step 305(A) a decision is made to determine whether $T_{demand}$ (engine torque, speed, gear ratio, etc.) is less than LRON WOT (maximum torque of engine 10 using only LRON fuel). If the answer is no, as in the previous algorithm, step 304 is entered. Alternatively, if the answer is yes, step 305(B) is entered for setting α=0. Otherwise, the operation of the algorithm of FIG. 5 is the same as that previously described for the algorithm of FIG. 3.

Figure 6:
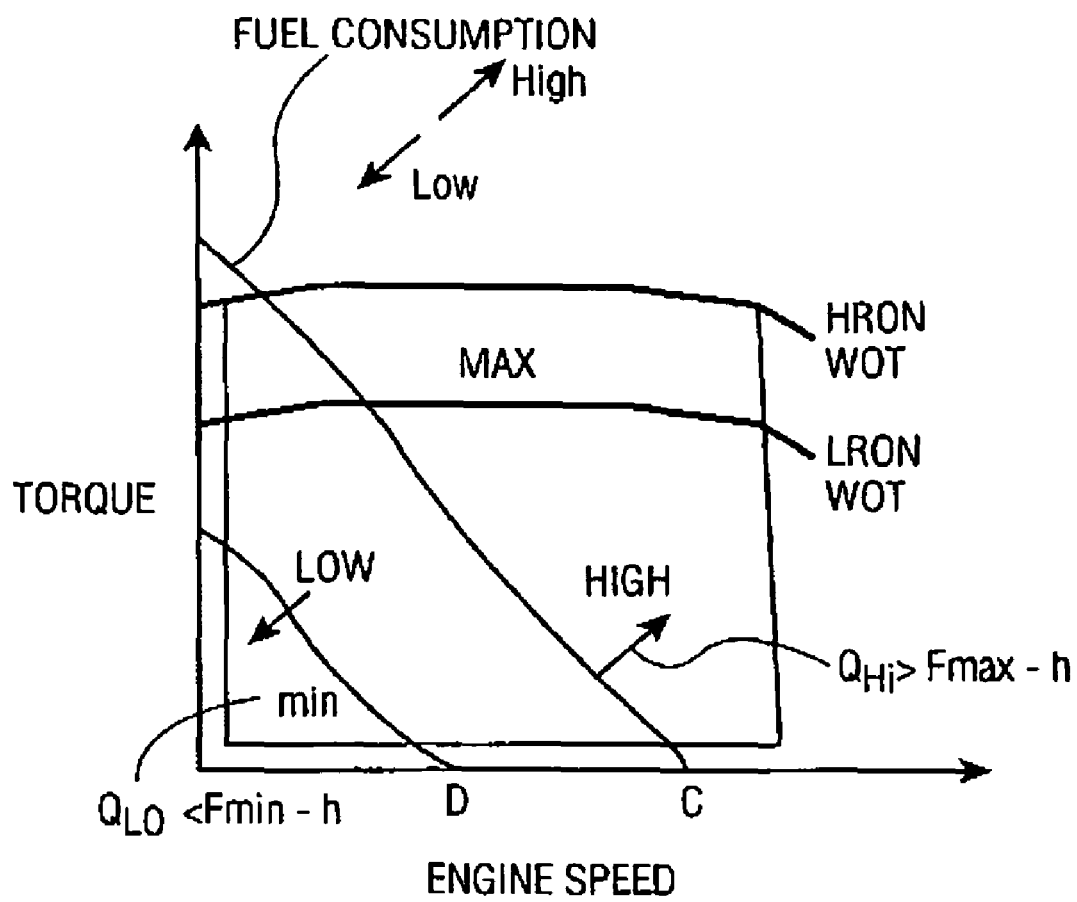
FIG. 6 is a plot of torque versus engine speed relative to fuel consumption and the fuel utilized, for an embodiment of the invention.

A plot of torque versus engine speed for engine 10 relative to fuel consumption is shown in FIG. 6. As shown maximum fuel consumption occurs when HRON fuel is being used to maximize torque output of engine 10. Also as shown, when only LRON fuel is being used to maximize the torque of engine 10, high fuel consumption occurred in the higher engine speed versus torque areas of the curve, whereas if engine speed and torque are reduced to below a threshold shown as "C", lower fuel consumption is realized. Minimal fuel consumption is obtained when the engine speed and torque are below a threshold "D" as shown in the curve.

Figure 7:
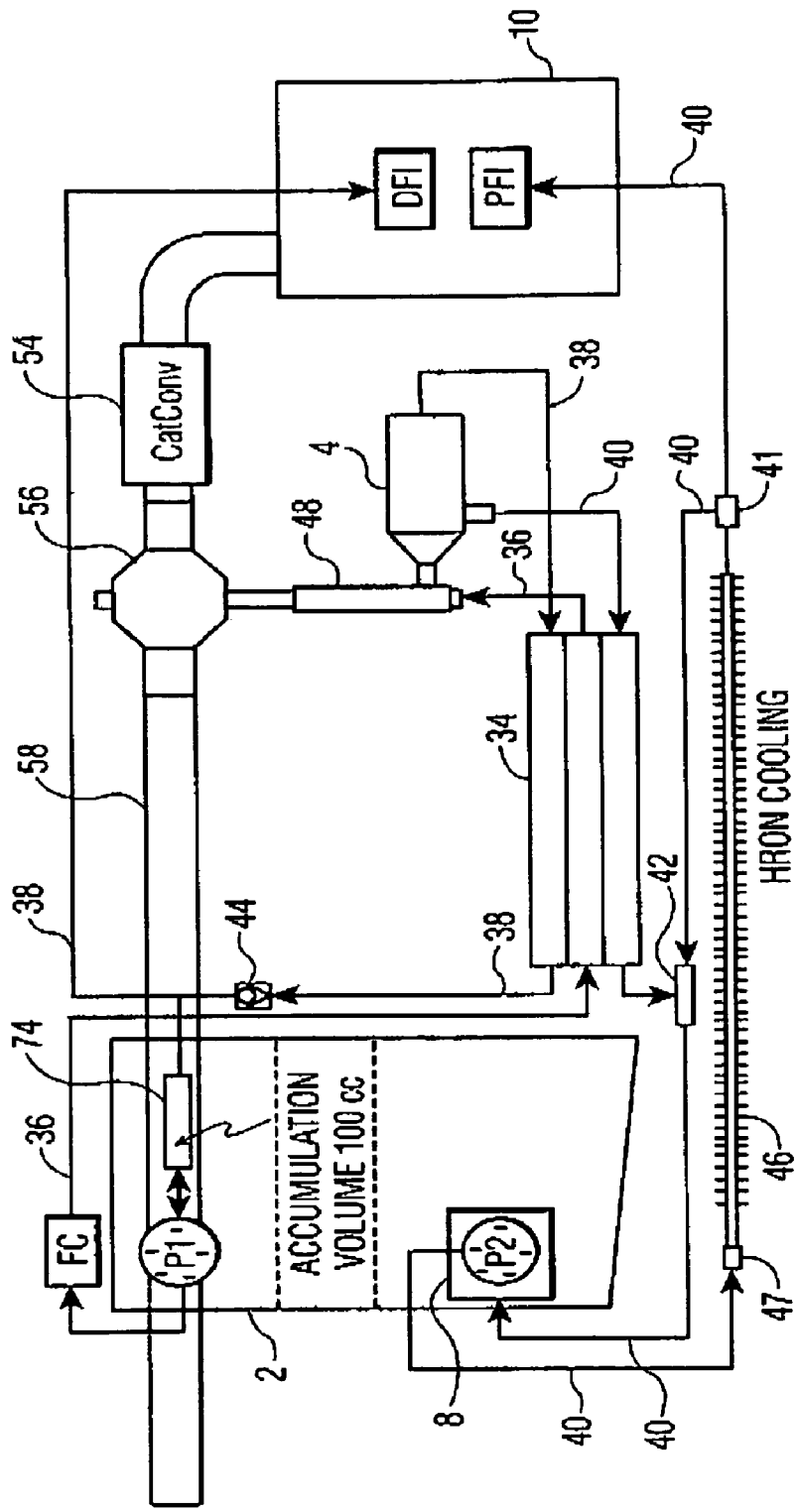
FIG. 7 shows a simplified block schematic diagram of a fuel management system for another embodiment of the invention.

In FIG. 7, the fuel management system of FIG. 1 has been expanded to show a simplified practical system for delivering multiple grades of RON fuel to an engine. The controller 14 of FIG. 1 is not shown in FIG. 7, but is considered to be included therein for controlling operation of the various mechanical and electromechanical components of the present system. In this example, the HRON tank 8 has been incorporated into a portion of the main tank 2, as shown. The pump P2 is incorporated within the HRON tank 8, as shown. The pump P1 is incorporated within the main tank 2. Also, a fuel storage volume provided by an accumulator 74 is included in the main tank 2, and operative to retain a portion of LRON fuel that has been produced by the OBS unit 4 but not consumed by the engine 10 at any given time. Any LRON fuel contained within the accumulation volume of accumulator 74 is available for delivery to the engine 10. In one embodiment the accumulation volume can merely be provided by a tube serving as an accumulator 74, and having a volume in this example of 100 cc (cubic centimeters), which volume is not meant to be limiting. Also, in another embodiment of the invention, the accumulation volume can be provided by a two-way piston accumulator 74, as shown in FIGS. 4A and 8, respectively. The two-way piston accumulator 74 is described in detail above with reference to FIG. 8.

With further reference to FIG. 7, a flow controller FC is installed in the IRON fuel path between pump P1 and an integrated heat exchanger 34. Note that IRON fuel flow is indicated by reference 36, LRON by reference 38, and HRON fuel by reference 40. An eductor 42 receives pressurized HRON fuel 40 for producing a vacuum for drawing HRON permeate or fuel 40 from OBS unit 4. A one-way valve 44 is included in the LRON fluid pathway 38 for preventing LRON fuel from flowing back to the integrated heat exchanger 34. The typically warm temperature HRON fuel 40 from P2 is passed through an air fin cooling tube 46 to maintain the temperature of HRON tank 8 near ambient. A heat pipe 48 is included for preheating the IRON fuel 36 before it is introduced into the OBS unit 4. In this example, the engine 10 includes a direct fuel injector DFI for injecting LRON fuel 38 into an associated cylinder of an engine 10, and a port fuel injector PFI for injecting HRON fuel 40 into the associated cylinder of the engine 10. Engine 10 exhaust gases are passed through a catalytic converter 54, a heat pipe heat exchanger 56, and a muffler exhaust pipe 58, as shown. A portion of the exhaust gas energy is utilized for heating the heat pipe 48. Also, the integrated heat exchanger 34 permits heat exchange between IRON fuel 36 being passed through to the OBS unit 4, and the HRON and LRON fuels 40, 38, respectively, received from the OBS unit 4 and passed through in the opposite direction to the flow of the IRON fuel 36 therethrough. Note that the use of exhaust gas energy for heating is not meant to be limiting, in that other heating mechanisms can be used. The HRON fuel 40 produced is stored within the HRON tank 8, as previously explained. Also, note that the reference numerals 41 and 47 each designate pipe or conduit couplings.

Note that the fuel management system of FIG. 7 can be utilized through appropriate flow control mechanisms, to maintain necessary operating temperature of the fuels to effect desired separation. For example, if the measured temperature of the IRON fuel to the OBS unit 4 exceeds a predetermined limit temperature, the IRON fuel 36 rate will be varied via flow controller FC to maintain the desired temperature.

Figure 9:
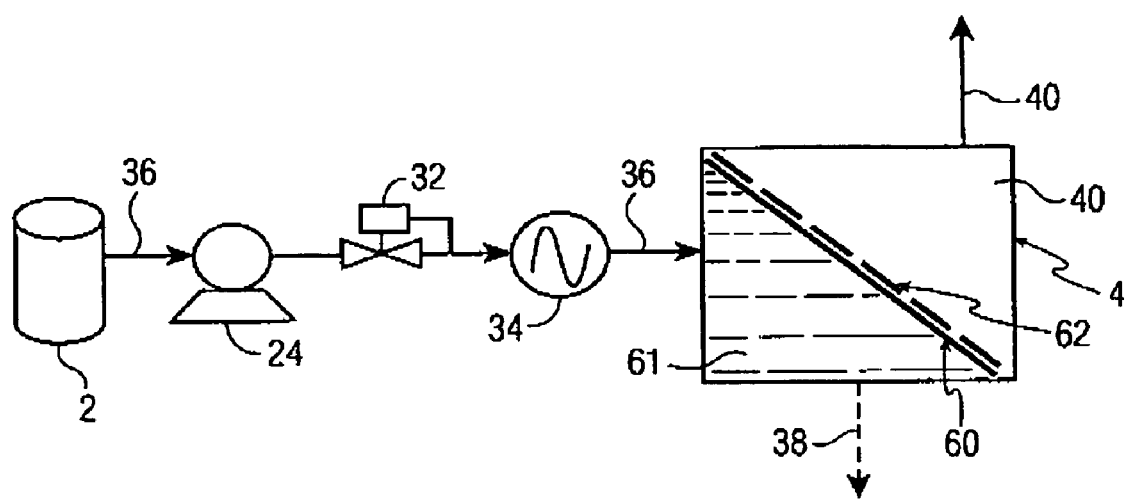
FIG. 9 shows a simplified block schematic diagram of a membrane separation process using a mixed vapor liquid feed, for an embodiment of the invention.

In FIG. 9, a simplified block schematic diagram is shown of components of the present system of FIG. 7 utilizing a membrane separation device for OBS unit 4 as taught in Provisional Application U.S. Ser. No. 60/830,914, filed on Jul. 14, 2006, for an "Improved Membrane Separation Process Using Mixed Vapor-Liquid Feed." The teachings of the latter are incorporated herein by reference to the extent they do not conflict herewith. More specifically, with regard to the illustrated OBS unit 4 of this embodiment, the integrated heat exchanger 34 provides for partially vaporizing IRON fuel to maintain dual feed states relative to the IRON fuel feed, which is fed to the OBS unit 4 as both liquid and vapor. The term "partially vaporized" means there is sufficient vaporization to provide the optimal vapor liquid mixture to the membrane. The liquid portion 60 contacts and wets the pervaporization membrane 62. The IRON liquid 60 has an increased content of the preferred permeate (relative to the IRON feed 36), while the vapor 61 phase has an increased content of the preferred retentate. In this example, the preferred permeate is HRON fuel, and the preferred retentate is LRON fuel.

The pervaporization membrane 62 is a selective membrane, selected to preferentially permeate the preferred permeate. For this application, an aromatic selective membrane such as described in U.S. Pat. No. 5,670,052 can be employed, for example. The teachings of this Patent are incorporated herein by reference to the extent that they do not conflict herewith. The selective pervaporization membrane 62 can include physical porous support means (not shown) such as Gortex™, for example, capable of providing physical support of the selective pervaporization membrane 62 under the temperature, pressure, and other conditions to be encountered. Alternative supports can include sintered metal or ceramic porous media. A preferred support means includes an asymmetric porous media such as a porous ceramic tube or monolith having a microporous surface material, as will be described for another embodiment of the invention for the OBS unit 4.

Figure 10A:
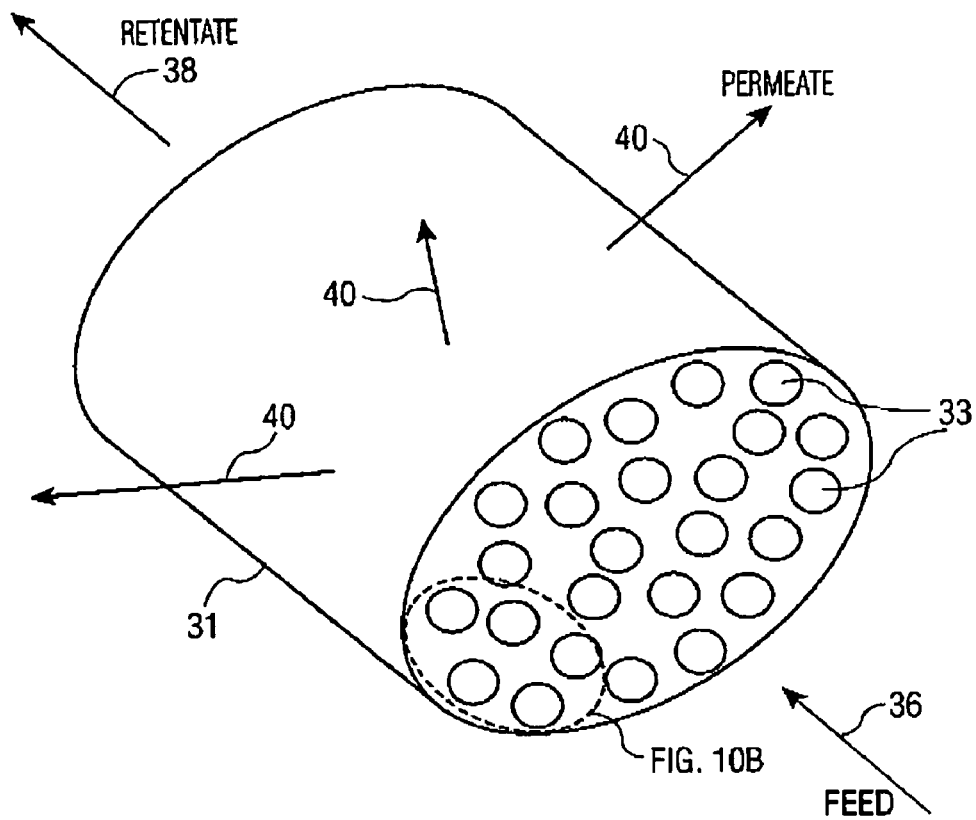
FIG. 10A shows a pictorial view of a polymer-coating inorganic membrane for separating aromatic and aliphatic compounds, for a preferred embodiment of the invention.
Figure 10B:
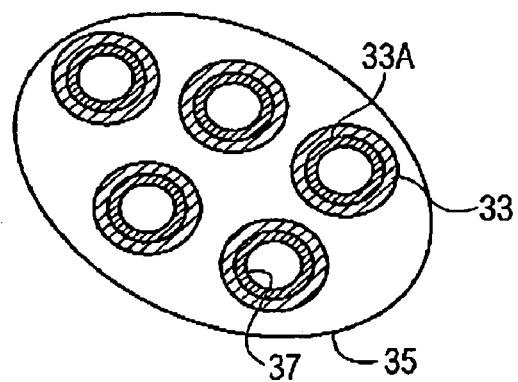
FIG. 10B shows an enlarged view of a portion of the front end of the polymer-coated inorganic membrane of a 10A.

In a preferred embodiment for the illustrated OBS unit 4 design, a cross-linked polyimide-polyadipate membrane polymer supported on a porous ceramic support means provides the membrane 62. Such configurations are taught in U.S. Provisional Application No. 60/836,319, filed on Aug. 8, 2006, for "Polymer-Coated Inorganic Membrane For Separating Aromatic And Aliphatic Compounds." The teachings of the latter are incorporated herein by reference to the extent that they do not conflict herewith. FIGS. 10A and 10B illustrate an embodiment from this Application that is considered a preferred embodiment for the present invention, and uses a tubular inorganic ceramic substrate. In FIG. 10A, a tubular inorganic substrate 31 is included for the OBS unit 4 in this embodiment. The porous inorganic substrate 31 can comprise silica or alumina coated mullite, or silicone carbide, or other suitable monolith structures, for example. As shown, in this example IRON fuel 36 is fed into a plurality of channels 33 within the porous inorganic substrate 31. The surfaces of the channels 33 can, in a preferred embodiment, comprise a porous inorganic material whose porosity differs from the bulk porosity of the substrate 31. Most preferably, the surface porosity of the channels 33 is less than or about equal to the aggregate polymer size of the associated polymer. As previously indicated, a cross-linked polyimide-polyadipate membrane polymer can be utilized. In FIG. 10B, an illustration of an exploded area 35 of FIG. 10A, illustrates that the channels 33 include an interior surface region 33A that may be formed by wash coating the interior surfaces of the channels 33 of substrate 31 to form a silica top coat, for example. The channels 33 having the optimal surface regions 33A are each coated with an associated polymer layer 37 to form the required membrane system. As shown in FIG. 10A, permeate (HRON fuel 40) from the membrane system is taken radially and retentate (LRON fuel 38) exits axially, in this embodiment.

In summary, the present invention provides for controlling the production and consumption of fuel in a vehicle equipped with an OBS unit 4, and an HRON tank 8, from amongst other components. The present system provides for producing HRON and LRON fuels from a feed of IRON fuel, and supplies the individual grade or a mix of the grades of fuel to the engine 10 as required by its operating state at a given time. The system is adaptive to modifying the rate of production of the fuels in accordance with the engine 10 demands.

The production rate control for the OBS unit 4 is provided by controlling the feed rate of the IRON fuel to the OBS unit 4 by setting the feed rate equal to the LRON fuel use at a given time, combined with the OBS unit 4 membrane flux. Typically, the membrane flux is estimated, and a measurement is continuously made of the amount of the LRON fuel being used by the engine at a given time. The production rate control minimizes the main tank 2 degradation by lowering OBS unit 4 feed rate to a minimum value, whenever the level of IRON fuel in the main tank 2 is below a predetermined threshold.

As further illustrated above, a consumption control algorithm provides for reducing the consumption of HRON fuel during shortages of this fuel by providing correction factors to the optimum RON Map shown in FIG. 2. The correction factor, in the example given above, as α, provides for accounting for the state of the engine when a fuel shortage occurs, and the level in the HRON tank 8 is at a predetermined threshold value. In the instant where the present system is used with a spark ignition internal combustion engine, the associated control system may adjust spark advance/retardation as required for insuring proper engine performance. Also, as indicated above, whenever the level of HRON fuel in tank 8 drops to below a predetermined level HLL, the controller 14 is operative to terminate any further delivery of HRON fuel to the engine 10, in order to prevent damage to various of the system components, such as pumps. Also, as previously indicated, the present system can be modified to be operative with more than two or three RON values of fuel, as previously described.

Note that the IRON fuel can also be designated as a regular grade fuel having an intermediate autoignition temperature (IAT) fuel. Similarly, the HRON fuel can be designated as a low autoignition temperature (LAT) fuel whose autoignition temperature is lower than that of IAT fuel. Lastly, the LRON fuel can be designated as a high autoignition temperature (HAT) fuel whose autoignition temperature is higher than that of IAT fuel.

Also note that FIG. 2 can be modified to provide an optimal autoignition fuels map to determine the fuel requirements in terms of autoignition temperature values. The optimal autoignition temperature map can be developed from the following equation:

$$\text{Autoignition Temperature}^{ideal} = f(\text{Torque, Speed, Gear ratio, accelerator velocity}) \quad (7)$$

The engine operating requirements can be matched to a plurality of market fuels by direct or indirect measurement of the quality of the LAT fuel produced by the OBS unit from each of the fuels.

Although various features of the present invention have been shown and described herein, they're not meant to be limiting. Those of skill in the art may recognize certain modifications to these embodiments, which modifications are meant to be covered by the spirit and scope of the appended claims. For example, in operating the OBS unit 4, the permeation rate can be set in excess of normal HRON demands, whereby the excess is passively recycled by overflow back to the OBS unit 4, as shown in FIG. 1, resulting in an increase in the RON value of the HRON fuel produced. Also, the present invention can be extended by matching the engine requirements to a plurality of market fuels by direct or indirect measurement of the quality of the HRON fuel being produced by the OBS unit 4. It also should be noted that the OBS unit 4 is not limited to the embodiments taught above, and can be provided by either one of silica gel, distillation, membranes, and coated ceramic monoliths, and so forth. In addition, although this invention is primarily described above in terms of control of the autoignition property RON in association with a plurality of different grades of gasoline selectively fed to an internal combustion spark ignition engine, those skilled in the art should recognize that the various embodiments of the present invention are equally applicable to diesel and other internal combustion compression ignition engines, where the fuel ignition property is expressed in cetane number rather than RON. For example, with regard to High Compression Combustion Ignition (HCCI) engines, the inventors believe a 15 to 85 cetane number range of diesel fuels would be usable, whereby at high engine load fuels having lower cetane number would be used, and at low engine loads fuels having higher cetane numbers would be used. However, the range of cetane numbers is not meant to be limiting, and is dependent upon the type of diesel engine being used.

What is claimed is:

1. A method for managing the delivery of fuel to an internal combustion engine of a vehicle, comprising the steps of:
    filling a main tank of said vehicle with a predetermined amount of regular fuel having an intermediate research octane number (IRON);
    controllably delivering IRON fuel from said main tank to an on-board separation (OBS) unit of said vehicle, said OBS unit being operable for separating said IRON fuel into a high research octane number (HRON) fuel and a low research octane number (LRON) fuel, higher and lower than said IRON fuel, respectively;
    delivering HRON fuel from said OBS unit to an HRON tank of said vehicle;
    monitoring the operational requirements of said engine at any given time;
    controllably and selectively delivering either HRON fuel from said HRON tank, or LRON fuel directly from said OBS unit, or a mixture thereof to said engine, in response to said monitoring step;
    measuring the HRON fuel level in said HRON tank;
    controlling both the production of said HRON and LRON fuels by said OBS unit, and the consumption of these fuels by said engine, in response to both said HRON level measuring step, and to said monitoring step, whenever the level of fuel in said HRON tank is within predetermined limits;
    controlling the production and consumption of HRON and LRON fuels in accordance with a predetermined algorithm, whenever the level of fuel in said HRON tank decreases to a predetermined lower limit; and
    recirculating HRON fuel from said HRON tank to either one or both of said OBS unit and said main tank, whenever the level of fuel in said HRON tank exceeds a predetermined high limit.

2. The method of claim 1, wherein said recirculation step further includes;
    installing a fuel supply pump in said main tank, said pump having an inlet port for receiving fuel, and an outlet port for delivering fuel to said OBS unit;
    installing a suction pipe in said main tank having a first port for receiving excess HRON fuel from said HRON tank; and
    delivering excess HRON fuel from said suction pipe to said inlet port of said fuel supply pump.

3. The method of claim 2, wherein said recirculation step further includes:
    installing a second port in said suction pipe for receiving excess LRON fuel from said OBS unit; and
    delivering excess LRON fuel from said suction pipe to said inlet port of said fuel supply pump.

4. A method for managing the delivery of fuel to an internal combustion engine of a vehicle, comprising the steps of:
    filling a main tank of said vehicle with a predetermined amount of regular fuel having an intermediate research octane number (IRON);
    controllably delivering IRON fuel from said main tank to an on-board separation (OBS) unit of said vehicle, said OBS unit being operable for separating said IRON fuel into a high research octane number (HRON) fuel and a low research octane number (LRON) fuel, higher and lower than said IRON fuel, respectively;

delivering HRON fuel from said OBS unit to an HRON tank of said vehicle;

monitoring the operational requirements of said engine at any given time;

controllably and selectively delivering either HRON fuel from said HRON tank, or LRON fuel directly from said OBS unit, or a mixture thereof to said engine, in response to said monitoring step;

measuring the HRON fuel level in said HRON tank;

controlling both the production of said HRON and LRON fuels by said OBS unit, and the consumption of these fuels by said engine, in response to both said HRON level measuring step, and to said monitoring step, whenever the level of fuel in said HRON tank is within predetermined limits; and controlling the production and consumption of HRON and LRON fuels in accordance with a predetermined algorithm, whenever the level of fuel in said HRON tank decreases to a predetermined low limit.

5. The method of claim 4, further including the step of:
controllably delivering HRON fuel from said OBS unit to said main tank whenever said HRON tank is filled to a predetermined level.

6. The method of claim 4, further including the step of:
controllably delivering LRON fuel from said OBS unit to an accumulation space, whenever said engine does not at a given time require the total amount of LRON fuel being produced by said OBS unit.

7. The method of claim 4, further including the step of:
controllably delivering IRON fuel from said main tank to said engine whenever HRON and LRON fuels are unavailable.

8. The method of claim 4, wherein said monitoring step includes the steps of:
sensing the torque versus engine speed of said engine at any given time; and
using an optimal RON map to determine the RON fuel requirement from the sensed torque and engine speed.

9. The method of claim 8, further including the step of developing said optimal RON map from the following equation:

$$RON.^{ideal}=f(\text{Torque, speed, gear ratio, accelerator, velocity}).$$

10. The method of claim 4, further including the step of matching the engine operating requirements to a plurality of market fuels by direct or indirect measurement of the quality of the HRON fuel produced by said OBS unit from each of the fuels.

11. The method of claim 4, further including the step of controllably recycling HRON fuel from said HRON tank to said OBS unit in the event of filling said HRON tank to a predetermined level.

12. The method of claim 4, wherein said step of controllably delivering IRON fuel from said main tank to said OBS unit, includes the step of equating short term LRON fuel production by the latter to short term LRON consumption by said engine via use of the formula:

$$F=L+h$$

wherein F is the gross mass feed rate (IRON fuel from main tank plus HRON fuel recycled from said HRON tank), L is the estimated average LRON fuel consumption rate, and h is the HRON fuel total production rate.

13. The method of claim 4, further including the step of terminating the delivery of HRON fuel to said engine if the level thereof in said HRON tank drops to below a predetermined level HLL.

14. The method of claim 6, further including the step of providing an open tube to serve as said accumulation space.

15. The method of claim 6, further including the step of providing a two-way piston accumulator to serve as said accumulation space.

16. The method of claim 15, further including the step of forming said accumulator to include:
a housing enclosing said accumulation space;
a piston located in said accumulation space, and slideably moveable therein; and
a two-way check valve centrally located within said piston.

17. The method of claim 4, further including the step of preheating said IRON fuel before its delivery to said OBS unit.

18. The method of claim 4, further including the step of delivering LRON fuel to a direct fuel injector of said engine.

19. The method of claim 18, further including the step of delivering IRON fuel to said direct fuel injector in the event of insufficient LRON fuel being available at a given time.

20. The method of claim 4, further including the step of delivering HRON fuel to a port fuel injector of said engine.

21. The method of claim 8, further including the step of:
applying a correction factor to said RON map in response to said level measuring step indicating that the level of HRON fuel in said HRON tank has dropped below a first threshold level HL, but is above a lower level HLL.

22. The method of claim 21, further including the step of terminating the delivery of HRON to said engine in response to said level measuring step indicating that the level of HRON fuel in said HRON tank has dropped to below $H_{LL}$.

23. The method of claim 4, further including the step of selecting said OBS unit from one of a group of separation mechanisms consisting of silica gel, distillation, membranes, and polymer coated ceramic monoliths.

24. The method of claim 4, further including for providing said OBS unit, the steps of:
forming a tubular porous inorganic ceramic substrate having a plurality of channels extending inward from one end;
coating the channels with an associated polymer;
feeding said IRON fuel into said plurality of channels;
taking said HRON fuel radially from said substrate; and
taking said LRON fuel axially from said substrate.

25. The method of claim 4, further including the step of cooling said HRON and said LRON fuels after taking them from said OBS unit.

26. In a motorized vehicle including a main fuel tank, an on-board separation (OBS) unit, a high research octane number (HRON) fuel tank, and an internal combustion engine, a method for selectively delivering fuel from one or a combination of said main tank, OBS unit, and HRON tank to said engine, comprising the steps of:
filling said main tank with a predetermined amount of fuel having an intermediate research octane number (IRON);
controllably delivering fuel from said main tank to said OBS unit;
operating said OBS unit to produce an HRON grade fuel, and a low research octane number LRON fuel;
delivering said HRON fuel from said OBS unit to said HRON tank;
controllably delivering said LRON fuel in a retentate stream directly from said OBS unit to said engine in a first mode of operation;

controllably delivering HRON fuel from said HRON tank to said engine in a second mode of operation;

sensing the level of HRON fuel in said HRON tank;

controllably delivering HRON fuel from said OBS unit to said main tank, in response to said level sensing step, at times that said HRON tank is filled to a predetermined level with HRON fuel;

controllably recycling HRON fuel from said HRON tank to said OBS unit, in response to said level sensing step, at times that said HRON tank is filled to a predetermined level;

limiting the delivery of LRON fuel in said retentate stream to said main tank;

controllably delivering IRON fuel from said main tank to said engine in a third mode of operation; and controlling the production of HRON and LRON fuels by said OBS unit both in response to said level sensing step, and to match the demand for these fuels by said engine at any given time.

27. A vehicle mounted fuel management system for delivering individually and/or in different mixtures a plurality of different grades of RON fuel to an associated internal combustion engine, comprising:

a main tank for containing a fuel having an intermediate research octane number (IRON); an on-board separation (OBS) unit receptive of IRON fuel, said OBS unit being operable for separating said IRON fuel into at least a high research octane number (HRON) fuel, and a low research number (LRON) fuel, higher and lower than said IRON fuel, respectively; flow control means for feeding IRON fuel from said main tank to said OBS unit;

an HRON tank for receiving and containing HRON fuel from said OBS unit;

means for measuring the level of HRON fuel in said HRON tank;

means for controllably and selectively delivering either HRON fuel from said HRON tank, or LRON fuel directly from said OBS unit, or a mixture thereof to said engine, in response to both said level measuring means, and the operational requirements of said engine at any given time; and means for controlling the speed of said flow control means to obtain a feed rate of said IRON fuel to said OBS unit, to control the latter's production of HRON and LRON fuels to match the demand for these fuels by said engine at any given time.

28. The fuel management system of claim 27, wherein said OBS unit is selected from one of a group of separation mechanisms consisting of silica gel, distillation, membranes, and polymer coated ceramic monoliths.

29. The fuel management system of claim 27, wherein said OBS unit includes:

a tubular porous inorganic ceramic substrate having a plurality of channels extending inward from one end; and an associating polymer coated on said channels, said channels being configured for receiving IRON fuel from said pump, whereby HRON fuel can be taken radially from said substrate, and LRON fuel can be taken axially from said substrate.

30. The fuel management system of claim 27, further including:

accumulator means connected between said main tank and an LRON output port of said OBS unit, for providing a storage space or volume for both storing excess LRON fuel produced by said OBS unit, and providing a fluid pathway for fuel from said main tank to be delivered to said engine in the even insufficient LRON and/or HRON fuels are available for delivery to said engine.

31. The fuel management system of claim 30, wherein said accumulator means includes an accumulator having an open storage volume.

32. The fuel management system of claim 30, wherein said accumulator means includes a piston accumulator.

33. The fuel management system of claim 32, wherein said piston accumulator includes a two-way check valve for both permitting LRON fuel in said storage volume to be pushed out of said accumulator by movement of a piston in one direction, to help overcome a deficiency in LRON fuel at a given time, and for permitting IRON fuel to be delivered to said engine when said piston moves opposite to said one direction to make up for insufficient LRON fuel and/or HRON fuel.

34. The fuel management system of claim 27, further including:

means for selectively delivering either LRON fuel to a direct fuel injector of said engine, or IRON fuel to said direct fuel injector in the event of an insufficiency of LRON fuel at any given time.

35. The fuel management system of claim 34, further including means for delivering HRON fuel to a port fuel injector of said engine.

36. The fuel management system of claim 27, further including means for delivering HRON fuel to a port fuel injector of said engine.

37. The fuel management system of claim 27, further including:

means for preheating IRON fuel before its delivery to said OBS unit.

38. A method for managing the delivery of fuel to an internal combustion engine of a vehicle, comprising the steps of:

filling a main tank of said vehicle with a predetermined amount of regular fuel having an intermediate autoignition temperature (IAT);

controllably delivering IAT fuel from said main tank to an on-board separation (OBS) unit of said vehicle, said OBS unit being operable for separating said IAT fuel into a high autoignition temperature (HAT) fuel and a low autoignition temperature (LAT) fuel, higher and lower than said IAT fuel, respectively;

delivering LAT fuel from said OBS unit to an LAT tank of said vehicle;

monitoring the operational requirements of said engine at any given time;

controllably and selectively delivering either LAT fuel from said LAT tank, or HAT fuel directly from said OBS unit, or a mixture thereof to said engine, in response to said monitoring step;

measuring the LAT fuel level in said LAT tank;

controlling both the production of said LAT and HAT fuels by said OBS unit, and the consumption of these fuels by said engine, in response to both said LAT level measuring step, and to said monitoring step, whenever the level of fuel in said LAT tank is within predetermined limits; and controlling the production and consumption of LAT and HAT fuels in accordance with a predetermined algorithm, whenever the level of fuel in said LAT tank is not within predetermined limits.

39. The method of claim 38, wherein said internal combustion engine consists of a diesel type compression combustion ignition engine, whereby said method further includes the steps of designating each of said IAT, LAT, and HAT fuel in terms of cetane number.

40. The method of claim 39, wherein said diesel engine is an HCCI engine, said method further including the steps of: selecting said LAT fuel to have a cetane number of 15; and selecting said HAT fuel to have a cetane number of 85.

41. The method of claim 39, wherein said cetane numbers are selected in accordance with the following equation:

$$\delta PM = C_1 \Delta CN + C_2 \Delta A\text{-Ring} + C_3 \Delta N\text{-Ring}$$

where, δPM: PM (particulate matter) fraction reduction relative to TF-ao
Δ: difference with respect to TF-ao CN: cetane number
A-Ring: aromatic rings (wt %)
N-Ring: naphthene rings (wt %)
Ci: regression coefficient (i=1, 2, 3)
$C_1$=0.0055
$C_2$=0.017
$C_3$=0.0065
TF: TF-series fuels.

42. The method of claim 38, wherein said engine is a spark ignition internal combustion engine, whereby said method further includes the steps of designating each of said IAT, LAT, and HAT fuels in terms of RON (Research Octane Number).

43. The method of claim 38, further including the step of: controllably delivering LAT fuel from said OBS unit to said main tank whenever said LAT tank is filled to a predetermined level.

44. The method of claim 38, further including the step of: controllably delivering HAT fuel from said OBS unit to an accumulation space, whenever said engine does not at a given time require the total amount of HAT fuel being produced by said OBS unit.

45. The method of claim 38, further including the step of: controllably delivering intermediate IAT fuel from said main tank to said engine whenever LAT and HAT fuels are unavailable.

46. The method of claim 38, wherein said monitoring step includes the steps of:
sensing the torque versus engine speed of said engine at any given time; and
using an optimal autoignition temperature fuels map to determine the fuel requirement in terms of autoignition temperature value from the sensed torque and engine speed.

47. The method of claim 46, further including the step of developing said optimal autoignition temperature map from the following equation:

$$\text{Autoignition Temperature}^{ideal} = f(\text{Torque, speed, gear ratio, accelerator velocity}).$$

48. The method of claim 38, further including the step of matching the engine operating requirements to a plurality of market fuels by direct or indirect measurement of the quality of the LAT fuel produced by said OBS unit from each of the fuels.

49. The method of claim 38, further including the step of controllably recycling LAT fuel from said LAT tank to said OBS unit in the event of filling said LAT tank to a predetermined level.

50. The method of claim 38, wherein said step of controllably delivering IAT fuel from said main tank to said OBS unit, includes the step of equating short term HAT fuel production by the latter to short term HAT consumption by said engine via use of the formula:

$$F = L + h$$

wherein F is the gross mass feed rate (IAT fuel from main tank plus LAT fuel recycled from said LAT tank), L is the estimated average HAT fuel consumption rate, and h is the LAT fuel total production rate.

51. The method of claim 38, further including the step of terminating the delivery of LAT fuel to said engine if the level thereof in said LAT tank drops to below a predetermined level HLL.

52. The method of claim 44, further including the step of providing an open tube to serve as said accumulation space.

53. The method of claim 44, further including the step of providing a two-way piston accumulator to serve as said accumulation space.

54. The method of claim 53, further including the step of forming said accumulator to include:
a housing enclosing said accumulation space;
a piston located in said accumulation space, and slideably moveable therein; and
a two-way check valve centrally located within said piston.

55. The method of claim 38, further including the step of preheating said IAT fuel before its delivery to said OBS unit.

56. The method of claim 38, further including the step of delivering HAT fuel to a direct fuel injector of said engine.

57. The method of claim 56, further including the step of delivering IAT fuel to said direct fuel injector in the event of insufficient HAT fuel being available at a given time.

58. The method of claim 38, further including the step of delivering LAT fuel to a port fuel injector of said engine.

59. The method of claim 46, further including the step of:
applying a correction factor to said autoignition temperature fuels map in response to said level measuring step indicating that the level of LAT fuel in said LAT tank has dropped below a first threshold level HL, but is above a lower level HLL.

60. The method of claim 59, further including the step of terminating the delivery of LAT fuel to said engine in response to said level measuring step indicating that the level of LAT fuel in said LAT tank has dropped to below $H_{LL}$.

61. The method of claim 38, further including the step of selecting said OBS unit from one of a group of separation mechanisms consisting of silica gel, distillation, membranes, and polymer coated ceramic monoliths.

62. The method of claim 38, further including for providing said OBS unit, the steps of:
forming a tubular porous inorganic ceramic substrate having a plurality of channels extending inward from one end;
coating the channels with an associated polymer;
feeding said IAT fuel into said plurality of channels;
taking said LAT fuel radially from said substrate; and
taking said HAT fuel axially from said substrate.

63. The method of claim 38, further including the step of cooling said LAT and said HAT fuels after taking them from said OBS unit.

64. The method of claim 46, wherein said internal combustion engine consists of a spark ignition internal combustion engine, whereby said method further includes the steps of designating each of said IAT, LAT, and HAT fuels in terms of RON (Research Octane Number).

65. The method of claim 64, wherein said autoignition fuels map consists of a RON Map to determine the RON fuel requirement from the sensed torque and engine speed.

66. The method of claim 46, wherein said internal combustion engine consists of a diesel type compression combustion ignition engine, whereby said method further includes the steps of designating each of said IAT, LAT, and HAT fuel in terms of cetane number.

67. The method of claim 66, wherein said autoignition fuels map consists of a Cetane Map to determine the cetane fuel requirement from the sensed torque and engine speed.

68. In a motorized vehicle including a main fuel tank, an on-board separation (OBS) unit, a low autoignition temperature (LAT) fuel tank, and an internal combustion engine, a method for selectively delivering fuel from one or a combination of said main tank, OBS unit, and LAT tank to said engine, comprising the steps of:
- filling said main tank with a predetermined amount of fuel having an intermediate autoignition temperature (IAT);
- controllably delivering fuel from said main tank to said OBS unit;
- operating said OBS unit to produce an LAT grade fuel, and a high autoignition temperature (HAT) fuel;
- delivering said LAT fuel from said OBS unit to said LAT tank;
- controllably delivering said HAT fuel in a retentate stream directly from said OBS unit to said engine in a first mode of operation;
- controllably delivering LAT fuel from said LAT tank to said engine in a second mode of operation;
- sensing the level of LAT fuel in said LAT tank;
- controllably delivering LAT fuel from said OBS unit to said main tank, in response to said level sensing step, at times that said LAT tank is filled to a predetermined level with LAT fuel;
- controllably recycling LAT fuel from said LAT tank to said OBS unit, in response to said level sensing step, at times that said LAT tank is filled to a predetermined level;
- limiting the delivery of HAT fuel in said retentate stream to said main tank;
- controllably delivering IAT fuel from said main tank to said engine in a third mode of operation; and
- controlling the production of LAT and HAT fuels by said OBS unit both in response to said level sensing step, and to match the demand for these fuels by said engine at any given time.

69. A vehicle mounted fuel management system for delivering individually and/or in different mixtures a plurality of different grades of fuel each designated in terms of autoignition temperature to an associated internal combustion engine, comprising:
- a main tank for containing a fuel having an intermediate autoignition temperature (IAT); an on-board separation (OBS) unit receptive of IAT fuel, said OBS unit being operable for separating said IAT fuel into at least a low autoignition temperature (LAT) fuel, and a high autoignition temperature (HAT) fuel, lower and higher than said IAT fuel, respectively;
- flow control means for feeding IAT fuel from said main tank to said OBS unit;
- an LAT tank for receiving and containing LAT fuel from said OBS unit;
- means for measuring the level of LAT fuel in said LAT tank;
- means for controllably and selectively delivering either LAT fuel from said LAT tank, or HAT fuel directly from said OBS unit, or a mixture thereof to said engine, in response to both said level measuring means, and the operational requirements of said engine at any given time; and
- means for controlling the speed of said flow control means to obtain a feed rate of said IAT fuel to said OBS unit, to control the latter's production of LAT and HAT fuels to match the demand for these fuels by said engine at any given time.

70. The fuel management system of claim 69, wherein said OBS unit is selected from one of a group of separation mechanisms consisting of silica gel, distillation, membranes, and polymer coated ceramic monoliths.

71. The fuel management system of claim 69, wherein said OBS unit includes:
- a tubular porous inorganic ceramic substrate having a plurality of channels extending inward from one end; and
- an associating polymer coated on said channels, said channels being configured for receiving IAT fuel from said pump, whereby LAT fuel can be taken radially from said substrate, and HAT fuel can be taken axially from said substrate.

72. The fuel management system of claim 69, further including:
- accumulator means connected between said main tank and a HAT output port of said OBS unit, for providing a storage space or volume for both storing excess HAT fuel produced by said OBS unit, and providing a fluid pathway for fuel from said main tank to be delivered to said engine in the even insufficient HAT and/or LAT fuels are available for delivery to said engine.

73. The fuel management system of claim 72, wherein said accumulator means includes an accumulator having an open storage volume.

74. The fuel management system of claim 72, wherein said accumulator means includes a piston accumulator.

75. The fuel management system of claim 74, wherein said piston accumulator includes a two-way check valve for both permitting HAT fuel in said storage volume to be pushed out of said accumulator by movement of a piston in one direction, to help overcome a deficiency in HAT fuel at a given time, and for permitting IAT fuel to be delivered to said engine when said piston moves opposite to said one direction to make up for insufficient HAT fuel and/or LAT fuel.

76. The fuel management system of claim 69, further including:
- means for selectively delivering either HAT fuel to a direct fuel injector of said engine, or IAT fuel to said direct fuel injector in the event of an insufficiency of HAT fuel at any given time.

77. The fuel management system of claim 76, further including means for delivering LAT fuel to a port fuel injector of said engine.

78. The fuel management system of claim 69, further including means for delivering LAT fuel to a port fuel injector of said engine.

79. The fuel management system of claim 69, further including:
- means for preheating IAT fuel before its delivery to said OBS unit.

* * * * *